(12) United States Patent
Alfonseca et al.

(10) Patent No.: US 9,619,450 B2
(45) Date of Patent: Apr. 11, 2017

(54) AUTOMATIC GENERATION OF HEADLINES

(71) Applicant: Google Inc., Mountain View, CA (US)

(72) Inventors: Enrique Alfonseca, Horgen (CH); Daniele Pighin, Zurich (CH); Guillermo Garrido Yuste, Madrid (ES); Ekaterina Filippova, Zurich (CH)

(73) Assignee: Google Inc., Mountain View, CA (US)

( * ) Notice: Subject to any disclaimer, the term of this patent is extended or adjusted under 35 U.S.C. 154(b) by 364 days.

(21) Appl. No.: 14/060,562

(22) Filed: Oct. 22, 2013

(65) Prior Publication Data
US 2015/0006512 A1 Jan. 1, 2015

Related U.S. Application Data

(60) Provisional application No. 61/840,417, filed on Jun. 27, 2013.

(51) Int. Cl.
| | | |
|---|---|---|
| *G06F 17/30* | (2006.01) | |
| *G06F 17/24* | (2006.01) | |
| *G06F 17/27* | (2006.01) | |
| *G06F 17/28* | (2006.01) | |

(52) U.S. Cl.
CPC ............ *G06F 17/24* (2013.01); *G06F 17/274* (2013.01); *G06F 17/2745* (2013.01); *G06F 17/2881* (2013.01)

(58) Field of Classification Search
CPC ......... G06F 17/30598; G06F 17/30528; G06F 17/2881; G06F 17/2745
See application file for complete search history.

(56) References Cited

U.S. PATENT DOCUMENTS

| | | | | |
|---|---|---|---|---|
| 8,429,179 | B1* | 4/2013 | Mirhaji | G06F 17/30312 707/756 |
| 8,712,934 | B2† | 4/2014 | Gross | |
| 2007/0213973 | A1* | 9/2007 | Rehberg | G06F 17/278 704/9 |
| 2010/0138216 | A1* | 6/2010 | Tanev | G06F 17/2765 704/9 |

(Continued)

OTHER PUBLICATIONS

Barzilay, Regina et al., "Learning to Paraphrase: An unsupervised Approach Using Multiple-Sequence Alignment," Proceedings of the 2003 Conference of the North American Chapter of the Association for Computational Linguistics on Human Language Technology, NAACL '03, May 27, 2003-Jun. 1, 2003, pp. 16-23, vol. 1, Morristown, NJ.*

(Continued)

*Primary Examiner* — Alexander Khong
(74) *Attorney, Agent, or Firm* — Patent Law Works LLP

(57) ABSTRACT

Sets of equivalent syntactic patterns are learned from a corpus of documents. A set of one or more input documents is received. The set of one or more input documents is processed for one or more expressions that match a set of equivalent syntactic patterns from among the sets of equivalent syntactic patterns. A syntactic pattern from among the set of equivalent syntactic patterns is selected for a headline. The syntactic pattern reflects a main event described by the set of one or more input documents. The headline is generated using the syntactic pattern.

15 Claims, 10 Drawing Sheets

(56) References Cited

U.S. PATENT DOCUMENTS

2011/0251984 A1* 10/2011 Nie .................. G06F 17/30731
706/18
2013/0311462 A1* 11/2013 Khan ................. G06F 17/2785
707/728

OTHER PUBLICATIONS

Genest, Pierre-Etienne et al., "Fully Abstractive Approach to Guided Summarization," Processings of the 50th Annual Meeting of the Association for Computational Linguistics, Jul. 8, 2012, pp. 354-358. Retrieved from the Internet: http://www.aclweb.org/anthology/P12-2069. Retrieved on Dec. 16, 2014.
Nakashole, Ndapandula et al., "PATTY: A Taxonomy of Relational Patterns with Semantic Types," EMNLP 2012, Jul. 12, 2012, 11 pages.
International Search Report and Written Opinion for PCT/US2014/020436, mailed on Jan. 12, 2015, 11 pages.
Alfonseca, et al., "HEADY: News headline abstraction through event pattern clustering", Proceedings of the 51st Annual Meeting of the Association for Computational Linguistics, pp. 1243-1253, Aug. 2013 (11 pages).
Over et al., "Intrinsic Evaluation of Generic News Text Summarization Systems", Document Understanding Conference 2003, (62 pages).
Litkowski et al., "Text Summarization using XML-Tagged Documents", Document Understanding Conference 2003, (8 pages).
Nenkova, et al., "Columbia at the Document Understanding Conference 2003", Document Understanding Conference 2003 (8 pages).
Nobata, et al., "Results of CRL/NYU System at DUC-2003 and an Experiment on Division of Document Sets", Document Understanding Conference 2003 (6 pages).
Bergler, et al., "Using Knowledge-poor Conference Resolution for Text Summarization", Document Understanding Conference 2003 (8 pages).
Ge, et al., "Approaches to Event-Focused Summarization Based on Named Entities and Query Words", Document Understanding Conference 2003 (9 pages).
Guo, et al., "A New Multi-document Summarization System", Document Understanding Conference 2003 (8 pages).
Angheluta, et al., "K.U. Leuven summarization system—DUC 2003", Document Understanding Conference 2003 (8 pages).
Han et al., "KU Text Summarization System for DUC 2003", Document Understanding Conference 2003 (4 pages).
Lacatusu, et al., "LITE-GISTEXTER: Generating Short Summaries with Minimal Resources", Document Understanding Conference 2003 (7 pages).
Hirao, et al., "NTT's Multiple Document Summarization System for DUC2003", Document Understanding Conference 2003 (5 pages).
Alfonseca, et al., "Description of the UAM system for generating very short summaries at DUC-2003", Document Understanding Conference 2003 (6 pages).
Fuentes, et al., "Mixed Approach to Headline Extraction for DUC 2003", Document Understanding Conference 2003 (8 pages).
Chali, et al., "The University of Lethbridge Text Summarizer at DUC 2003", Document Understanding Conference 2003 (5 pages).
Dunlavy, et al., "Performance of a Three-Stage System for Multi-Document Summarization", Document Understanding Conference 2003 (7 pages).
Radev, et al., "MEAD ReDUCs: Michigan at DUC 2003", Document Understanding Conference 2003 (8 pages).
Farzindar, et al., "Using Background Information for Multi-document Summarization and Summaries in Response to a Question", Document Understanding Conference 2003 (6 pages).
Zhou, et al., "Headline Summarization at ISI", Document Understanding Conference 2003 (5 pages).
Copeck, et al., "Picking Phrases, Picking Sentences", Document Understanding Conference 2003 (8 pages).
Over et al., "Intrinsic Evaluation of Generic News Text Summarization Systems", Document Understanding Conference 2004, (84 pages).
Litkowski, et al., "Summarization Experiments in DUC 2004", Document Understanding Conference 2004 (8 pages).
Blair-Goldensohn, et al., "Columbia University at DUC 2004", Document Understanding Conference 2004 (8 pages).
Bergler, et al., "Multi-ERSS and ERSS 2004", Document Understanding Conference 2004 (8 pages).
Conroy, et al., "Left-Brain/Right-Brain Multi-Document Summarization", Document Understanding Conference 2004 (9 pages).
D'Avanzo et al., "Keyphrase Extraction for Summarization Purposes: The LAKE System at DUC 2004", Document Understanding Conference 2004 (5 pages).
Angheluta et al., "K.U. Leuven Summarization System at DUC 2004" Document Understanding Conference 2004 (9 pages).
Lacatusu et al., "Lite-GISTexter at DUC 2004" Document Understanding Conference 2004 (6 pages).
Fatma et al., "Summarization at LARIS Laboratory" Document Understanding Conference 2004 (9 pages).
Vanderwende et al., "Event-Centric Summary Generation" Document Understanding Conference 2004 (6 pages).
Hirao et al., "NTT's Multiple Document Summarization System for DUC2004" Document Understanding Conference 2004 (3 pages).
Nobata et al., "CRL/NYU Summarization System at DUC-2004" Document Understanding Conference 2004 (5 pages).
Alfonseca et al., "Description of the UAM system for generating very sort summaries at DUC-2004" Document Understanding Conference 2004 (9 pages).
Doran et al., "News Story Gisting at University College Dublin" Document Understanding Conference 2004 (6 pages).
Chali et al., "Summarization Techniques at DUC 2004" Document Understanding Conference 2004 (7 pages).
Zajic et al., "BBN/UMD at DUC-2004: Topiary" Document Understanding Conference 2004 (8 pages).
Erkan et al., "The University of Michigan at DUC 2004" Document Understanding Conference 2004 (8 pages).
Douzidia et al., "Lakhas, an Arabic summarization system" Document Understanding Conference 2004 (8 pages).
Copeck, et al., "Vocabulary Agreement Among Model Summaries and Source Documents" Document Understanding Conference 2004 (8 pages).
Kolluru et al., "Decremental Feature-Based Compaction" Document Understanding Conference 2004 (6 pages).
Saggion et al., "Multi-Document Summarization by Cluster/Profile Relevance and Redundancy Removal" Document Understanding Conference 2004 (8 pages).
Daume III et al., "A Tree-Position Kernel for Document Compression" Document Understanding Conference 2004 (6 pages).
Liang et al., "Feature Selection for Summarising: The Sunderland DUC 2004 Experience" Document Understanding Conference 2004 (8 pages).

\* cited by examiner
† cited by third party

AUTOMATIC GENERATION OF HEADLINES

CROSS-REFERENCE TO RELATED APPLICATIONS

This application claims the benefit under 35 U.S.C. §119(e) of U.S. Provisional Application No. 61/840,417, titled "Automatic Generation of Headlines" and filed on Jun. 27, 2013, the entire contents of which are incorporated herein by reference.

BACKGROUND

The present disclosure relates to automatically generating headlines.

To generate headlines for news articles, some current approaches include manually generating the headlines or automatically identifying and selecting a sentence from an article as the title. However, these approaches are often not scalable to cover news crawled from the web. This can sometimes be due to the large amount of manual intervention required or that the approaches are based on a model set of articles with consistent content and formatting, where articles crawled from the web often have varying content and formatting.

Some existing solutions attempt to use a main passage of the articles as the headlines for those articles. However, these solutions are often not practical because important information may be distributed across several sentences in the article, or the selected sentence may be longer than a desired or allowable headline size. To reduce the size of the sentence, some solutions have attempted to reorder the words of the sentence. However, the reordering techniques used by them have yielded headlines that are susceptible to containing incorrect grammar. Other approaches, which select one or more sentences and then reduce them to a target headline size, rely on manual supervision and/or annotations, and are thus generally not scalable and are generally only applicable to a single document and not a collection of two or more news articles.

In addition, keeping knowledge databases updated with the latest headlines has often been difficult because of the level of human effort required to keep the databases up-to-date. For instance, in some existing systems, if a notable event occurs, the knowledge databases have to be manually updated with information about the event.

SUMMARY

According to one innovative aspect of the subject matter being described in this disclosure, a system learns sets of equivalent syntactic patterns from a corpus of documents. The system receives a set of one or more input documents. The system processes the set of one or more input documents for one or more expressions matching a set of equivalent syntactic patterns from among the sets of equivalent syntactic patterns. The system selects a syntactic pattern from among the set of equivalent syntactic patterns for a headline, the syntactic pattern reflecting a main event described by the set of one or more input documents. The system generates the headline using the syntactic pattern.

In general, another innovative aspect of the subject matter described in this disclosure may be embodied in methods that include learning sets of equivalent syntactic patterns from a corpus of documents; receiving a set of one or more input documents; processing the set of one or more input documents for one or more expressions matching a set of equivalent syntactic patterns from among the sets of equivalent syntactic patterns; selecting a syntactic pattern from among the set of equivalent syntactic patterns for a headline, the syntactic pattern reflecting a main event described by the set of one or more input documents; and generating the headline using the syntactic pattern.

Other implementations of one or more of these aspects include corresponding systems, apparatus, and computer programs, configured to perform the actions of the methods, encoded on computer storage devices.

These and other implementations may each optionally include one or more of the following features. For instance, the operations may further include mapping the sets of equivalent syntactic patterns to corresponding items in a knowledge graph; determining one or more entities from the one or more expressions that match the set of equivalent syntactic patterns; determining one or more entries in the knowledge graph corresponding to the one or more entities described by the one or more expressions; updating the one or more entries in the knowledge graph to reflect the main event using the headline; processing one or more entities from the one or more expressions; that generating the headline includes populating the syntactic pattern with the one or more entities; receiving sets of related documents; determining, for each of the sets of related documents, expressions involving corresponding information; determining sets of equivalent syntactic patterns based on the expressions; storing the sets of equivalent syntactic patterns in a data store; determining additional hidden syntactic patterns to include in one or more of the sets of equivalent syntactic patterns using a probabilistic model; determining that a number of expressions processed from the one or more input documents meets a pre-determined evidence threshold; and determining the set of equivalent syntactic patterns to be relevant to the set of one or more input documents based on the evidence threshold being met. For instance, the features may include that the set of one or more input documents include a news collection of related news articles.

The technology described herein is advantageous in a number of respects. For example, the technology can learn a model of equivalent expressions and use it to understand what is the main event reported in one or more news documents, and can scale to handle web-sized data, with millions of news articles processed in one run of the system. In addition, the technology can generate headlines for one or several documents that did not appear in the original documents based on the equivalent expressions describing events that are automatically learned. This can, in some cases, provide the benefit of generating headlines that are not subject to copyright (as they are not using the same words as the published works). This technology can also automatically determine the associations between the learned patterns and the relations in a knowledge base, and update those relations as the latest news about various entities is processed. As a result, the procedure for keeping the knowledge base current can be fully automated using this technology, thus reducing and/or eliminating the need for human annotation.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

DETAILED DESCRIPTION

Figure 1:
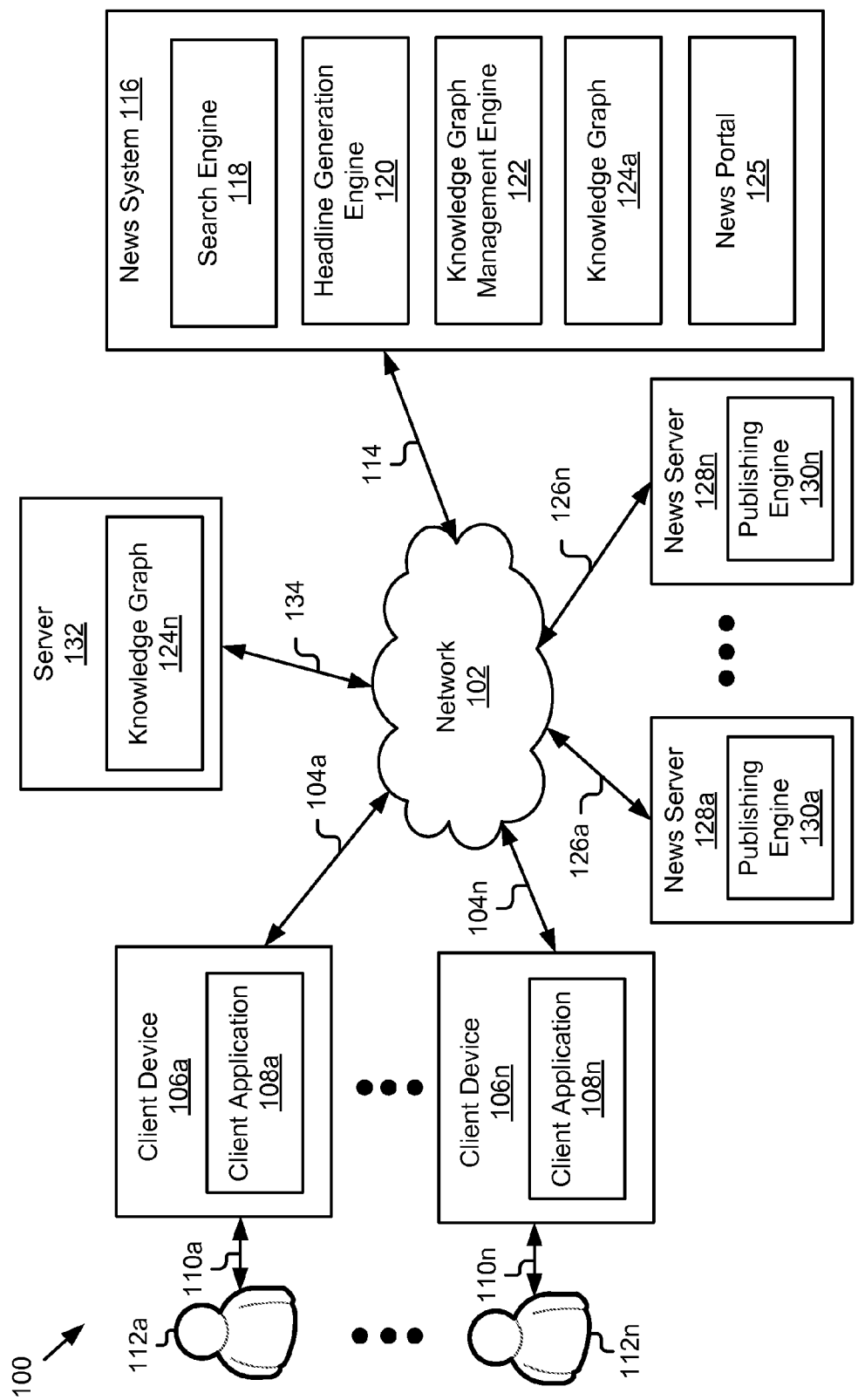
FIG. 1 is a block diagram illustrating an example system for automatically generating headlines and maintaining an up-to-date knowledge graph.

News events are often reported in different ways, for example, from multiple points of view by a variety of news agencies rather than from a single point of view. Different news agencies can interpret a given event in different ways and various countries or locations may highlight different aspects of the event, or describe those aspects differently, depending on how they are affected. In addition, opinions and in-depth analyses about the event are usually written after the fact. The variety of contents and styles can be both an opportunity and a challenge. For instance, the different ways in which different news sources describe a given event can provide redundancy that is useful for summarization, as the information content reported by the majority of news sources can often most likely represent the central part of the event. However, given the variability and subjectivity of these different articles, it can be difficult to formulate in an objective way what has happened.

As a non-limiting example, Table 1 shows the different headlines observed in news reporting the wedding between a two example celebrities, a prominent basketball player, James Jones, and a well-known actress, Jill Anderson.

TABLE 1

Headlines observed for a news collection reporting the same wedding event

James Jones and Jill Anderson Party It Up with Kim and Ciara
Jill Anderson and James Jones: Wedding Day Bliss
James Jones, actress Jill Anderson wed in NYC
Stylist to the Stars
Jill Anderson, James Jones Set Off Celebrity Wedding Weekend
Cathy rocks a Versace Spring 2010 mini to Jill Anderson and James Jones's wedding (photos)
Jill Anderson on her wedding dress, cake, reality TV show and fiancé, James Jones (video)

TABLE 1-continued

Headlines observed for a news collection reporting the same wedding event

Jill Anderson marries sports star James Jones
Mike Brown Returns to NYC for James Jones's Wedding
James Jones's stylist dishes on the wedding
Paul pitching another Big Three with "James Jones in NYC"
James Jones and Jill Anderson Get Married at Star-Studded Wedding Ceremony As can be seen from the above example headlines, there are a wide variety of ways to report the same event, including different points of view, highlighted aspects, and opinionated statements. When presenting this event to a user in a news-based information retrieval or recommendation system, different event descriptions may be more appropriate. For example, a user may only be interested in objective, informative summaries without any interpretation on the part of the reporter.

The technology described herein includes a system that, given a collection of documents that are related (e.g., the news articles with headlines from Table 1), can generate a compact, informative, and/or unbiased title (e.g., headline) describing the main (e.g., most important/salient/relevant) event from the collection. The technology is fully open-domain capable and scalable to web-sized data. By learning to generalize events across the boundaries of a single news story or news collection, the technology can produce compact and effective headlines that objectively convey the relevant information. For instance, the technology can generalize across synonymous expressions that refer to the same event, and do so in an abstractive fashion, to produce a headline with novelty, objectivity, and generality. The generated headline may in some cases not even be mentioned/included in any of documents of the news collection.

In some implementations, from a web-scale corpus of news, the technology can process syntactic patterns and generalize those patterns using a Noisy-OR model into event descriptions. At inference time, the technology can query the model with the patterns observed in a new/previously unseen news collection, identify the event that best captures the gist of the collection and retrieve the most appropriate pattern to generate a headline. This technology is advantageous because it can produce headlines that performs comparably to human-generated headlines, as evaluated with ROUGE (a standard software package for evaluating summaries), without requiring manual evaluation and/or intervention.

The technology described herein may also be used to generate a headline for a single news document. For instance, the input (e.g., the collection of news) may include just one document and the output may be a headline describing the most salient event reported in the input. Headlines can also be generated by the technology for a user-selected subset of the entities (e.g., locations, companies, or celebrities) mentioned in the news. The technology can advantageously leverage the headline processing performed by it to keep a knowledge base up-to-date with the most current events and information.

FIG. 1 is a block diagram of an example system 100 for automatically generating headlines and maintaining an up-to-date knowledge graph. The illustrated system 100 includes client devices 106*a* . . . 106*n* (also referred to individually and/or collectively as 106), news servers 128*a* . . . 128*n* (also referred to individually and/or collectively as 128), a news system 116, and a server 132, which are communicatively coupled via a network 102 for interaction with one another. For example, the client devices 106*a* . . . 106*n* may be respectively coupled to the network 102 via signal lines 104*a* . . . 104*n* and may be accessible by users 112*a* . . . 112*n* (also referred to individually and/or collectively as 112) as illustrated by lines 110*a* . . . 110*n*. The news servers 128*a* . . . 128*n* may be respectively coupled to the network 102 via signal lines 126*a* . . . 126*n* and the news system 116 may be coupled to the network 102 via signal line 114. The server 132 may be coupled to the network 102 via signal line 134. The use of the nomenclature "a" and "n" in the reference numbers indicates that the system 100 may include any number of those elements having that nomenclature.

It should be understood that the system 100 illustrated in FIG. 1 is representative of an example system for generating headlines and maintaining an up-to-date knowledge graph, and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system may be integrated into to a single computing device or system or additional computing devices or systems, etc.

The network 102 may include any number and/or type of networks, and may be representative of a single network or numerous different networks. For example, the network 102 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, various combinations thereof, etc.

The client devices 106*a* . . . 106*n* (also referred to individually and collectively as 106) are computing devices having data processing and communication capabilities. In some implementations, a client device 106 may include a processor (e.g., virtual, physical, etc.), a memory, a power source, a communication unit, and/or other software and/or hardware components, including, for example, a display, graphics processor, wireless transceivers, keyboard, camera, sensors, firmware, operating systems, drivers, various physical connection interfaces (e.g., USB, HDMI, etc.). The client devices 106*a* . . . 106*n* may couple to and communicate with one another and the other entities of the system 100 via the network 102 using a wireless and/or wired connection.

Examples of client devices 106 may include, but are not limited to, mobile phones, tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106*a* . . . 106*n* may be the same or different types of computing devices.

In the depicted implementation, the client devices 106*a* . . . 106*n* respectively contain instances 108*a* . . . 108*n* of a client application (also referred to individually and/or collectively as 108). The client application 108 may be storable in a memory (not shown) and executable by a processor (not shown) of a client device 106. The client application 108 may include a browser application (e.g., web browser, dedicated app, etc.) that can retrieve, store, and/or process information hosted by one or more entities of the system 100 (for example, the news server 128 and/or the news system 116) and present the information on a display device (not shown) on the client device 106.

The news servers 128*a* . . . 128*n* (also referred to individually and collectively as 128) and the server 132 may each include one or more computing devices having data processing, storing, and communication capabilities. For example, a news server 128 and/or server 132 may include one or more hardware servers, server arrays, storage devices, virtual devices and/or systems, etc. In some implementations, the news servers 128*a* . . . 128*n* and/or server 132 may include one or more virtual servers, which operate in a host server environment and access the physical hardware of the host server including, for example, a processor, memory, storage, network interfaces, etc., via an abstraction layer (e.g., a virtual machine manager).

In the depicted implementation, the news servers 128*a* . . . 128*n* include publishing engines 130*a* . . . 130*n* (also referred to individually and/or collectively as 130) operable to provide various computing functionalities, services, and/or resources, and to send data to and receive data from the other entities of the network 102. For example, the publishing engines 130 may embody news sources that provide, publish, and/or syndicate news on a variety of different topics via the network 102. The content (e.g., news) from these news sources may be aggregated by one or more components of the network including, for example, search engine 118.

News may include new information as provided by established news sources, blogs, microblogs, social media streams, website postings and/or updates, news feeds in various formats (e.g., HTML, RSS, XML, JSON, etc.), etc. In some instances, the publishing engines 130 provide documents about events that are occurring (e.g., real-time) including, for example, regional news, national news, sports, politics, world news, entertainment, research, technology, local events and news, etc., and users 112 may access the news portals to consume the content. The documents may include any type of digital content including, for example, text, photographs, video, etc. The news servers 128 may be accessible and identifiable on the network 102, and the other entities of the system 100 may request and receive information from the news servers 128. In some implementations, news may be embodied by content (e.g., posts) submitted by users on a social network, microblogs, or other socially enabled computing platform on which users may broadcast information to one another.

The news system 116 is a computing system capable of aggregating news and processing news collections, automatically learning equivalent syntactic patterns, and automatically generating headlines and updating a knowledge graph using the syntactic patterns. Further, it should be understood that the headlines generated, training performed, and the knowledge graph management performed by the news system 116 may be done in real-time (e.g., upon user request), may be processed for news collections as they are aggregated by the search engine 118, and may be processed at regular time intervals (e.g., minute(s), hour(s), days(s), end of the day, etc.), in other applicable fashions. In some instances, the news system 116 may provide users with the ability to search for relevant news documents and receive news summaries containing the relevant headlines and news collections about the news objects the users are interested in. In the depicted implementation, the news system 116 includes a search engine 118, a headline generation engine 120, a knowledge graph management engine 122, a knowledge graph 124*a*, and a news portal 125.

The search engine 118 may aggregate news documents from a variety of news sources for searchability and retrievability, and/or store the news documents in a data store for later access and/or retrieval. In some implementations, the search engine 118 may crawl the various entities interconnected via network 102 for documents stored on those entities, including, for example, web content (e.g., HTML, portable documents, audio and video content, images), structured data (e.g., XML, JSON), objects (e.g., executables), etc. The search engine 118 may aggregate the documents (and/or incremental updates thereto), process the aggregated data for optimal searchability, and provide the aggregated/processed data to the other components of the system 100 and/or store in a data store (e.g., data store 210 in FIG. 2A) as aggregated data 214 for access and/or retrieval by the other components of the system 100, including, for example, the headline generation engine 120 and/or its constituent components, the knowledge graph management engine 122, and/or the news portal 125. The search engine 118 may be coupled to these components, the data store 210, and/or the knowledge graphs 124a . . . 124n (also referred to herein individual and/or collectively as 124) to send and/or receive data.

In some implementations, the search engine 118 may interact, via the network 102, with the publication engines 130 of the news servers 128 to aggregate news documents, process the news documents into related sets, and store and/or provide the aggregated sets of news documents to other components of the news system 116. For example, the search engine 118 may generate news collections from aggregated documents by grouping them based on closeness in time and/or cosine similarity (e.g., using a vector-space model and weights). In some instances, a news collection may include a single document. In further instances, a news collection may include any number of documents (e.g., 2+, 5+, 50+, etc.)

Figure 2:
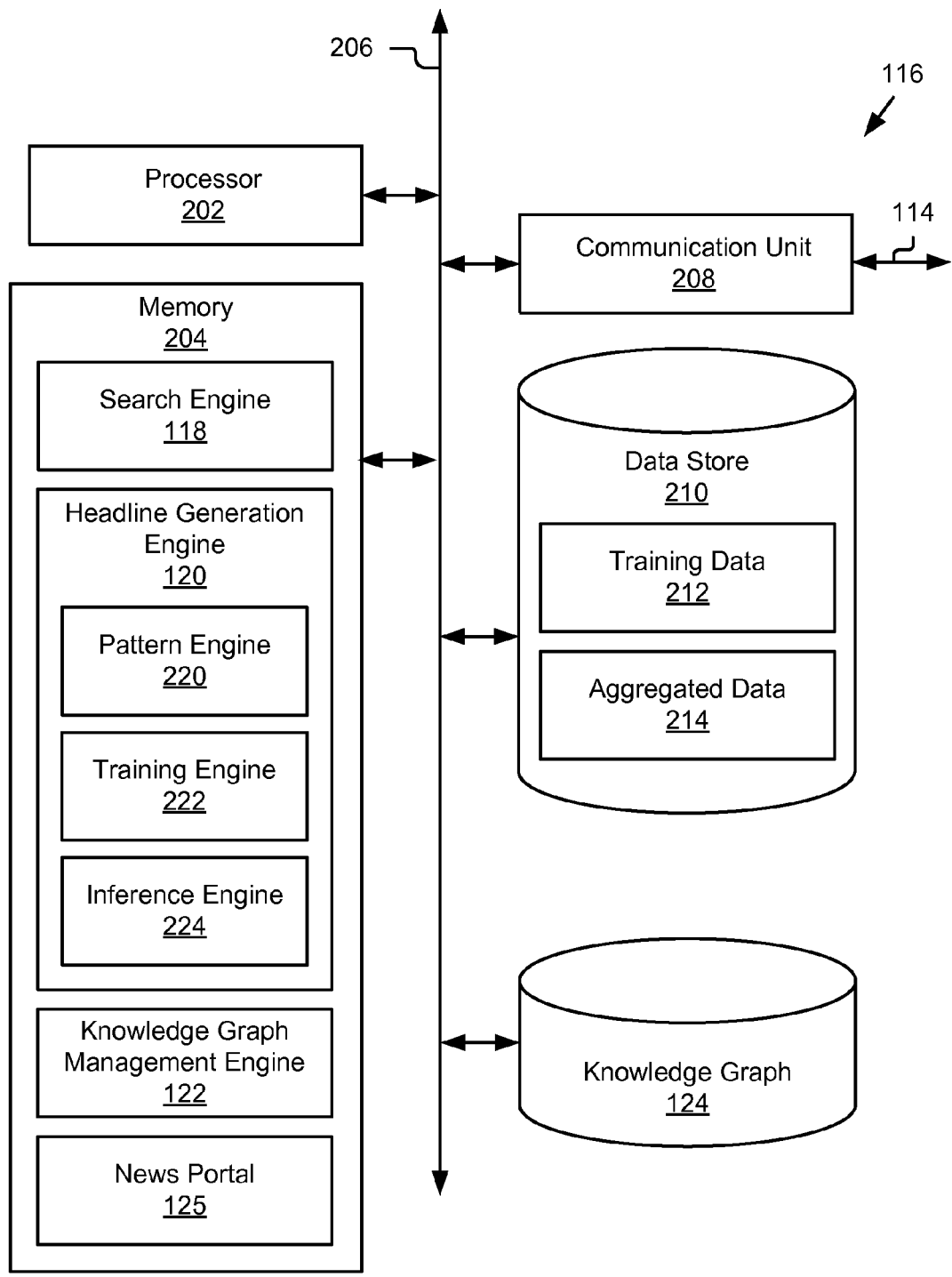
FIG. 2 is a block diagram illustrating an example news system.

The headline generation engine 120 (e.g., pattern engine 220 and/or training engine 222 as shown in FIG. 2) may receive the sets of related news documents (e.g., from the data store 210, the search engine 118, etc.) and process each of them for clusters of equivalent syntactic patterns of events and entities. The headline generation engine 120 (e.g., inference engine 224 as shown in FIG. 2) may automatically generate headlines for the sets of news documents based on the clusters of equivalent syntactic patterns.

The knowledge graph management engine 122 may automatically update the knowledge graphs 124a . . . 124n based on the clusters of equivalent syntactic patterns. The knowledge graph 124 may include a database for storing and providing access to organized information. In some implementations, the knowledge graph 124 may organize entities relative to their place in the world and their relations. The knowledge graph may embody a corpus of knowledge like an encyclopedia or other knowledge source. The knowledge graph may include one or more computing devices and non-transitory storage mediums for processing, storing, and providing access to the data. In some implementations, the knowledge graph may be integrated with the news system 116 or may include in a computing device or system that is distinct from the news system 116, including, for example, the server 132. Non-limiting examples of a knowledge graph include Freebase, Wikipedia, etc. The technology described herein is advantageous as it can reduce the human effort needed to keep a knowledge graph current, as discussed further elsewhere herein.

Utilizing the news portal 125, users may search for, access, receive alerts on, share, endorse, etc., various news collections summarized using the headlines generated by the headline generation engine 120. In some implementations, the news portal 125 may be hosted in a computing system (e.g., server) that is distinct from the news system 116. It should be understood that while this technology is described with the context of news, it is applicable to any content platform, including, for example, social media (e.g., social networks, microblogs, blogs, etc.) and can be utilized by these computing services to summarize content posts, trending activity, etc.

In some implementations, the news portal 125 includes software and/or logic executable to determine one or more news collections and/or corresponding documents associated with one or more objects, and generate and provide news summaries including the news collection(s) and/or document(s). In some implementations, a news summary may be generated in response to a search query and may be generated based on the parameters of the query. Example parameters may include data describing one or more objects, a time frame, a number of documents and/or collections to be included, a sorting criterion, etc. For instance, a search query may include the name of an object (e.g., a person, thing, event, topic, etc.). In some instances, the query parameters may include text, images, audio, video, and/or any other data structure that can be processed and matched to stored data.

Figure 10:
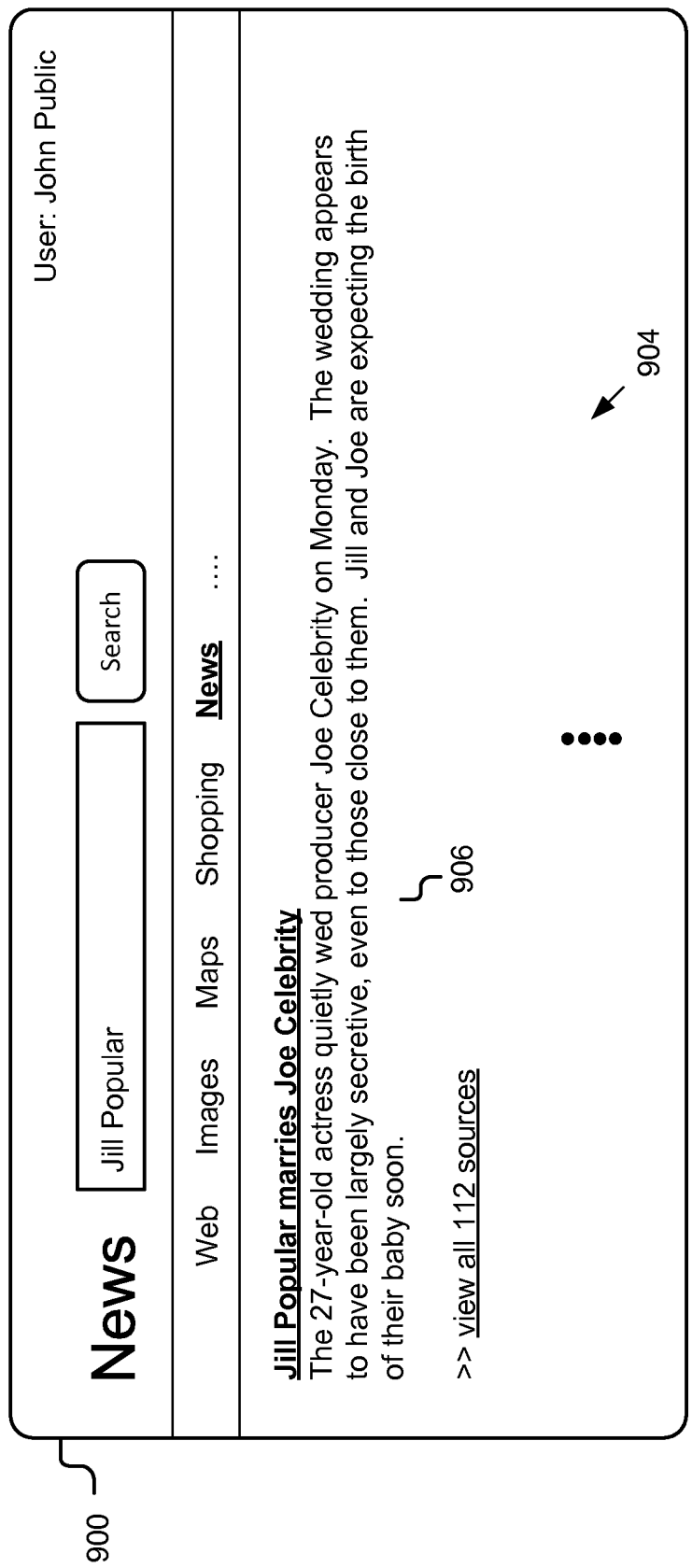
FIG. 10 is an example graphical user interface including sample relevant abstracted headlines.

The news portal 125 may determine the information to include for a given object based on the relevance of the news collections and/or their constituent documents. For instance, the search engine 118 may generate a relevance ranking for the news collections and store the rankings in association with the corresponding news collections in the data store 210. In the summaries, the news portal 125 may include the headline generated by the news system 116 for the news collection along with a general description of each of the news collections and/or documents included in the news summary. An example user interface depicting an example summary generatable by the news portal 125 is depicted in FIG. 10, and discussed in further detail elsewhere herein. The general description for a news collection may be generated based on documents that make up the news collection. The news portal 125 may sort the items to be included in the news summary based on time, relevance, event-type, a user-defined criterion, etc. For example, the news summary may be a chronological news summary of the most relevant events associated with the object or objects being queried.

The news summaries provided by the news portal 125 may be processed by the news portal 125 to include presentational information and the client application 108 may use the presentational information to form the look and feel of a user interface and then present the information to a user 112 via the user interface. For example, the news summaries may be formatted using a markup language (e.g., HTML, XML, etc.), style sheets (e.g., CSS, XSL, etc.), graphics, and/or scripts (e.g., JavaScript, ActionScript, etc.), and the client application 108 may interpret the interface instructions and render an interactive Web User Interface (WUI) for display on a user device 106 based thereon. In some implementations, the client application 108 may determine the formatting and look and feel of the user interfaces independently. For instance, the client application 108 may receive a structured dataset (e.g., JSON, XML, etc.) including the news summary and may determine formatting and/or look and feel of the user interfaces client-side. Using the user interfaces presented by the client application 108, the user can input commands selecting various user actions. For example, using these interfaces users can transmit a search request, implicitly request suggestions for a search, view and interact with search suggestions, view and interact with the news summaries and its constituent elements, etc.

The news portal 125 may be coupled to the network 102 to send the news summaries to the computing devices requesting them, including, for example, the client devices 106. The news portal 125 may also be coupled to the other components of the headline generation engine 120 to send and/or receive data.

In some implementations, the news portal 125 may generate search suggestions for a given entity based on the headlines generated for news collections reporting news about that entity. For example, the news portal 125 may receive a suggestion request, determine the search parameters from the request, and generate and provide the search suggestions. In some implementations, the request may be an asynchronous request transmitted by the client application 108 (e.g., a web browser) to the news system 116, and in response, the news portal 125 may generate a structure dataset (e.g., JSON, XML, etc.) including the suggestions and transmit the dataset back to the client device 106 for presentation in (near) real-time.

The news portal 125 may determine the suggestions based on the headlines (e.g., headline data) processed by the inference engine 224. In some implementations, based on the continual aggregation by the search engine 118, training by the training engine 222, headline generation by the inference engine 224, and/or the knowledge management by the knowledge graph management engine 122, the headline data includes the most current headlines and/or events pertaining to a given entity, and the news portal 125 may generate suggestions based on the headlines and provide them in response to the request.

The news portal 125 may be coupled to the network 102 to provide the search suggestions to other entities of the system 100 including, for example, the client devices 106. The news portal 125 may also be coupled to the data store 210 (e.g., directly, network, an API, etc.) to retrieve, store, or otherwise manipulate data including, for example, entity-related data, headline data, etc.

Because users often search for information about significant events that are occurring or that have just occurred, and the news system 116 is capable of providing accurate descriptions of the most current, useful, pertinent, popular, reliable, etc., information about those events and/or related entities, whether it be in the form of search suggestions, news summaries, or other content provided to the user by the news system 116 (e.g., via electronic message alerts, social network updates, etc.).

Additional functionality of the news system 116 is described in further detail below with respect to at least FIG. 2.

FIG. 2 is a block diagram of an example news system 116. As depicted, the news system 116 may include a processor 202, a memory 204, a communication unit 208, a data store 210, and a knowledge graph 124, which may be communicatively coupled by a communication bus 206. The news system 116 depicted in FIG. 2 is provided by way of example and it should be understood that it may take other forms and include additional or fewer components without departing from the scope of the present disclosure. For instance, various components of the news system 116 may reside on the same or different computing devices and may be coupled for communication using a variety of communication protocols and/or technologies including, for instance, communication buses, software communication mechanisms, computer networks, etc.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single processing unit or a plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the news system 116 including, for example, the memory 204, the communication unit 208, and the data store 210.

The memory 204 may store and provide access to data to the other components of the news system 116. The memory 204 may be included in a single computing device or a plurality of computing devices as discussed elsewhere herein. In some implementations, the memory 204 may store instructions and/or data that may be executed by the processor 202. For example, as depicted, the memory 204 may store the search engine 118, the headline generation engine 120, the knowledge graph management engine 122, and the news portal 125. The memory 204 is also capable of storing other instructions and data, including, for example, an operating system, hardware drivers, other software applications, databases, etc. The memory 204 may be coupled to the bus 206 for communication with the processor 202 and the other components of news system 116.

The memory 204 includes one or more non-transitory computer-usable (e.g., readable, writeable, etc.) mediums, which can be any tangible apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited to, one or more of a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blue-ray™, etc.). It should be understood that the memory 204 may be a single device or may include multiple types of devices and configurations.

The bus 206 can include a communication bus for transferring data between components of a computing device or between computing devices, a network bus system including the network 102 or portions thereof, a processor mesh, various connectors, a combination thereof, etc. In some implementations, the search engine 118, the headline generation engine 120, and the knowledge graph management engine 122 operating on the news system 116 may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices for wired and/or wireless connectivity with the network 102 and the other entities and/or components of the system 100 including, for example, the client devices 106, the news servers 128, etc. For instance, the communication unit 208 may include, but is not limited to, CAT-type interfaces; wireless transceivers for sending and receiving signals using Wi-Fi™; Bluetooth®, cellular communications, etc.; USB interfaces; various combinations thereof; etc. The communication unit 208 may be coupled to the network 102 via the signal line 114 and may be coupled to the other components of the news system 116 via the bus 206. In some implementations, the communication unit 208 can link the processor 202 to the network 102, which may in turn be coupled to other processing systems. The communication unit 208 can provide other connections to the network 102 and to other entities of the system 100 using various standard communication protocols, including, for example, those discussed elsewhere herein.

The data store 210 is an information source for storing and providing access to data. In some implementations, the data store 210 may be coupled to the components 202, 204, 208, 118, 120, 122, 124, and/or 125 of the news system 116 via the bus 206 to receive and provide access to data. In some implementations, the data store 210 may store data received from the other entities 106, 128, and 132 of the system 100, and provide data access to these entities. Examples of the types of data stored by the data store 210 may include, but are not limited to, the training data 212 (e.g., learned syntactic patterns, probabilistic model(s), entity clusters, etc.), the aggregated data 214 (e.g., documents aggregated and processed by the search engine 118), news collection data, document data, event data, entity data, user data, etc.

The data store 210 can include one or more non-transitory computer-readable mediums for storing the data. In some implementations, the data store 210 may be incorporated with the memory 204 or may be distinct therefrom. In some implementations, the data store 210 may include a database management system (DBMS) operable by the news system 116. For example, the DBMS could include a structured query language (SQL) DBMS, a NoSQL DMBS, various combinations thereof, etc. In some instances, the DBMS may store data in multi-dimensional tables comprised of rows and columns, and manipulate, i.e., insert, query, update and/or delete, rows of data using programmatic operations.

As depicted, the headline generation engine 120 may include a pattern engine 220, a training engine 222, and an inference engine 224. The components 118, 120, 220, 222, 224, 122, and/or 125 may be communicatively coupled by the bus 206 and/or the processor 202 to one another and/or the other components 204, 208, 210, and/or 124 of the news system 116. In some implementations, one or more of the components 118, 120, 220, 222, 224, 122, and/or 125 are sets of instructions executable by the processor 202 to provide their functionality. In other implementations, one or more of the components 118, 120, 220, 222, 224, 122, and/or 125 are stored in the memory 204 of the news search system 116 and are accessible and executable by the processor 202 to provide their functionality. In any of the foregoing implementations, these components 204, 208, 210, and/or 124 may be adapted for cooperation and communication with the processor 202 and other components of the news system 116.

The pattern engine 220 includes software and/or logic executable by the processor 202 to determine the syntactic patterns of one or more news collections. In some implementations, the pattern engine 220 may preprocess a news collection by diagramming sentences of each document of the news collection, determine the entities mentioned by each document of the news collection, and determine entity-related information for each of those entities. The pattern engine 220 may also determine the entities that are relevant in the news collection (e.g., based on a threshold, probability, heuristic, etc.); determine the syntactic patterns involving the entity types associated with those entities in the news collection; and then cluster equivalent syntactic patterns together. For instance, the patterns processed by the pattern engine 220 from the same news collection and for the same set of entities can be grouped together for use during headline generation and/or knowledge graph management.

In some implementations, the pattern engine 220 may determine equivalent syntactic patterns for one or more news collections for use during training/learning, headline generation, and/or knowledge graph management as discussed further herein. For example, the pattern engine 220 may identify, for a given news collection, the equivalent syntactic patterns connecting k entities (e.g., k≥1), which express events described by the news collection, and can be used for headline generation, as discussed in further detail herein. The training engine 222, the inference engine 224, and/or the knowledge graph management engine 122 may be coupled to the pattern engine 220 to provide news collection data and/or receive syntactic pattern data (e.g., clusters of equivalent syntactic patterns). In some instances, the pattern engine 220 may store the syntactic pattern data it generates in the data store 210 for access and/or retrieval by it and/or the other entities of the system 116 including, for example, the training engine 222, the inference engine 224, and/or the knowledge graph management engine 122.

To identify the patterns from the one or more documents of a given news collection, the pattern engine 220 may process one or more portions of the documents including metadata, the document body, embedded content, etc. In some implementations, the pattern engine 220 may only consider the title and the first sentence of the document body. This can increase performance by limiting processing of each news collection to the most relevant event(s) reported by that collection, which are often reported in these two content regions. For instance, unlike titles, first sentences generally do not extensively use puns or other rhetoric as they tend to be grammatical and informative rather than catchy. It should be understood that, in various implementations, the pattern engine 220 is not limited to using the title and first sentence, and may utilize any of the content included in the document(s) depending upon application and needs.

In some implementations, patterns may be determined from a repository N of one or more news collections $N_1, \ldots, N_{|\mathcal{N}|}$. Each news collection $N=\{n_i\}$ may be an unordered collection of related news, each of which can be seen as an ordered sequence of sentences, e.g.: $n=[s_0, \ldots s_{|n|}]$. During training, the repository may include several news collections to provide an expansive set of base patterns that can be used for matching during headline generation and/or knowledge graph management.

The pattern engine 220 may use the following algorithm (CollectionToPatterns$_\Psi(\mathcal{N})$) to identify one or more clusters of equivalent syntactic patterns from a repository of the one or more news collections $\mathcal{N}$ and using a set of parameters $\Psi$ that control the pattern identification process:

```
ℛ ← { }
for all N ∈ 𝒩 do
    PREPROCESSDATA (N)
    E ← GETRELEVANTENTITIES (N')
    for all E_i ← COMBINATIONS_ψ(E) do
        for all n ∈ N do
            𝒫 ← EXTRACTPATTERNS_ψ(n, E_i)
            ℛ{N, E_i} ← ℛ{N, E_i} ∪ 𝒫
return ℛ
```

In the above COLLECTIONTOPATTERNS algorithm, the sub-routine PREPROCESSDATA can preprocess each of the documents included in each of the news collections. In some implementations, this preprocessing can be performed using a NLP pipeline including tokenization and sentence boundary detection, part-of-speech tagging, dependency parsing, coreference resolution, and entity linking based on a knowledge graph (e.g., knowledge graph 124). In some instances, the pattern engine 220 may label each entity mentioned in each document of the collection with a unique label, a list including each time that entity is mentioned in the document, and a list of class labels for that entity from one or more knowledge graphs. For example, using a knowledge graph dataset, the pattern engine 220 can annotate each entity with the knowledge graph types (classification labels) that apply to that entity. As a further example, for the entity, Barack Obama (the 44$^{th}$ President of the United States), the pattern engine 220 can annotate his entity with the Freebase class labels that apply, including, for example, US president; politician; political appointer; U.S. congressperson; polled entity; etc. As a result, for each entity mentioned in each document, a unique identifier, a list of mentions, and a list of class labels can be produced by the preprocessing, which can be stored and/or cached for later reference and/or processing (e.g., in the data store 210, memory 204, etc.).

Figure 7:
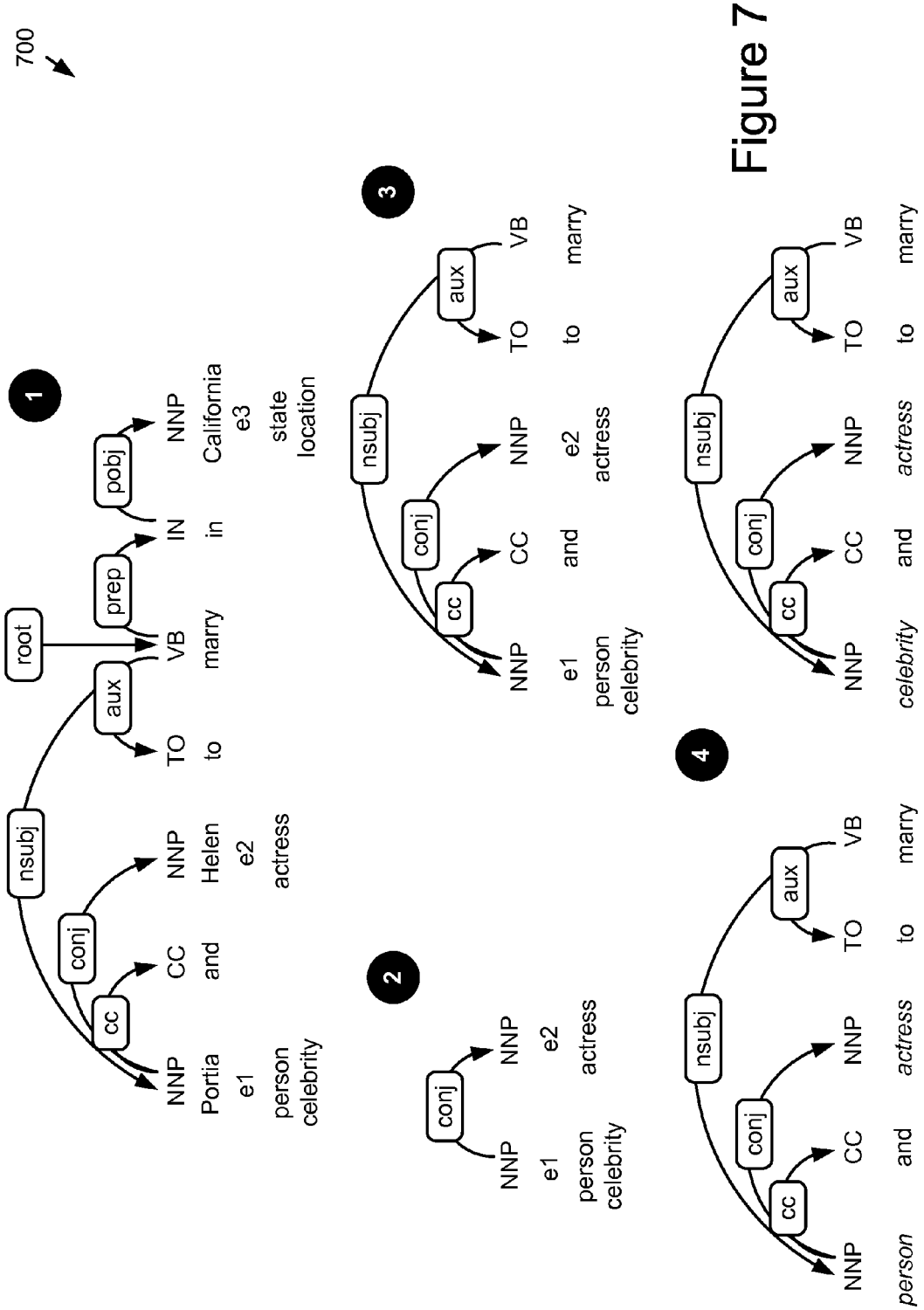
FIG. 7 is an example method depicting an example pattern determination process.

Preprocessing the data can also provide for each sentence in the document(s) of each news collection a set of data representing the sentence structure, for example, as exemplified in FIG. 7, item (1). In this example, three distinct entities mentioned in the sentence have been identified, e.g., $e_1$, $e_2$, and $e_3$ and labeled using an entity type (e.g., class label) determined during the preprocessing of each entity. For instance, in the knowledge graph list of types (class labels), $e_1$ is a person, $e_2$ is an actress, and a celebrity, and $e_3$ is a state and a location.

Next, the GETRELEVANTENTITIES sub-routine can collect a set of entities E that are relevant (e.g., mentioned most often based on a threshold, are the most central (e.g., based on location/placement, etc.)) within each news collection N. For the set of entities E, the algorithm can then determine a set of unique entity combinations, for example, by generating the set COMBINATIONS_ψ (E) having non-empty subsets of E, without repeated entities. The number of entities to consider in each collection, and the maximum size for the subsets of entities to consider are meta-parameters embedded in Ψ. In implementations where the objective is to generate short titles (e.g., under 10 words), the system may in some cases only consider combinations of up to a certain number (e.g., 3) elements of E. As a further example, the set COMBINATIONS_ψ (E) may describe the unique ways in which the various entities E are described by the sentences of the news collection(s).

Next, the algorithm may determine the nodes of the sentences that mention the relevant entities, determine syntactic patterns mentioning the entities, transform the syntactic patterns if necessary so they are grammatically proper, and cluster equivalent syntactic patterns mentioning same types together. These clustered syntactic patterns can be reflective of an event involving the types. In particular, for instance, the sub-routine EXTRACTPATTERNS can then process event patterns 𝒫 for each subset of relevant entities $E_i$ from the documents n in each news collection N.

In some implementations, executing EXTRACTPATTERNS_ψ (n, $E_i$) may process and return a set of equivalent syntactic patterns 𝒫 from the documents n using the following algorithm, which is exemplified graphically in FIG. 7 items (2-4):

```
𝒫 ← ∅
for all s ∈ n[0: 2) do
    T ← DEPPARSE (s)
    M_i ← GETMENTIONNODES (t, E_i)
    if ∃e ∈ E_i, count(e, M_i) ≠ 1 then continue
        P_i ← GETMINIMUMSPANNINGTREE_ψ(M_i)
    APPLYHUERISTICS_ψ(P_i) or continue
    𝒫 ← 𝒫 ∪ COMBINEENTITYTYPES_ψ(P_i)
return 𝒫
```

In the above algorithm, the sub-routine GETMENTIONNODES can first identify the set of nodes $M_i$ that mention the entities in $E_i$ using the sub-routine DEPPARSE for a sentence s, which returns a dependency parse T. If T does not contain exactly one mention of each target entity in $E_i$, then the sentence is ignored. Otherwise, the sub-routine GETMINIMUMSPANNING-TREE can compute the minimum spanning tree (MST) for the nodeset $P_i$. $P_i$ is the set of nodes around which the patterns can be constructed and the minimum spanning tree reflects the shortest path in the dependency tree that connects all the nodes in $M_i$, as illustrated in FIG. 7, item (2).

Next, the algorithm may determine whether to apply heuristics using the APPLYHEURISTICS subroutine. In some cases, the MST for the nodeset $P_1$ that the system can compute may not constitute a grammatical or useful extrapolation of the original sentence s. For example, the MST for the entity pair <$e_1$; $e_2$> in the example depicted in FIG. 7, item (2) does not provide a good description of the event as it is neither adequate nor fluent. For this reason, the system can apply a set of post-processing heuristic transformations that provide a minimal set of meaningful nodes. The transformation may provide that both the root of the clause and its subject appear in the extracted pattern, and that conjunctions between entities are not dropped, as shown in FIG. 7, item (3).

The algorithm may then combine the entity types from the nodeset $P_i$ using the sub-routine COMBINEENTITYTYPES, which can generate a distinct pattern 𝒫 from each possible combination of entity type assignments for the participating entities $e_i$, as illustrated by item (4) in FIG. 7. The data generated by the pattern engine 220, including pattern and/or entity-related information (e.g., entity information including IDs and class labels, clusters of equivalent syntactic patterns describing entity-related events, etc.) may be stored in the data store 210 or provided to the other components of the system 116, including, for example, the training engine 222, inference engine 224, and/or the knowledge graph management engine 122 for use thereby.

Figure 9:
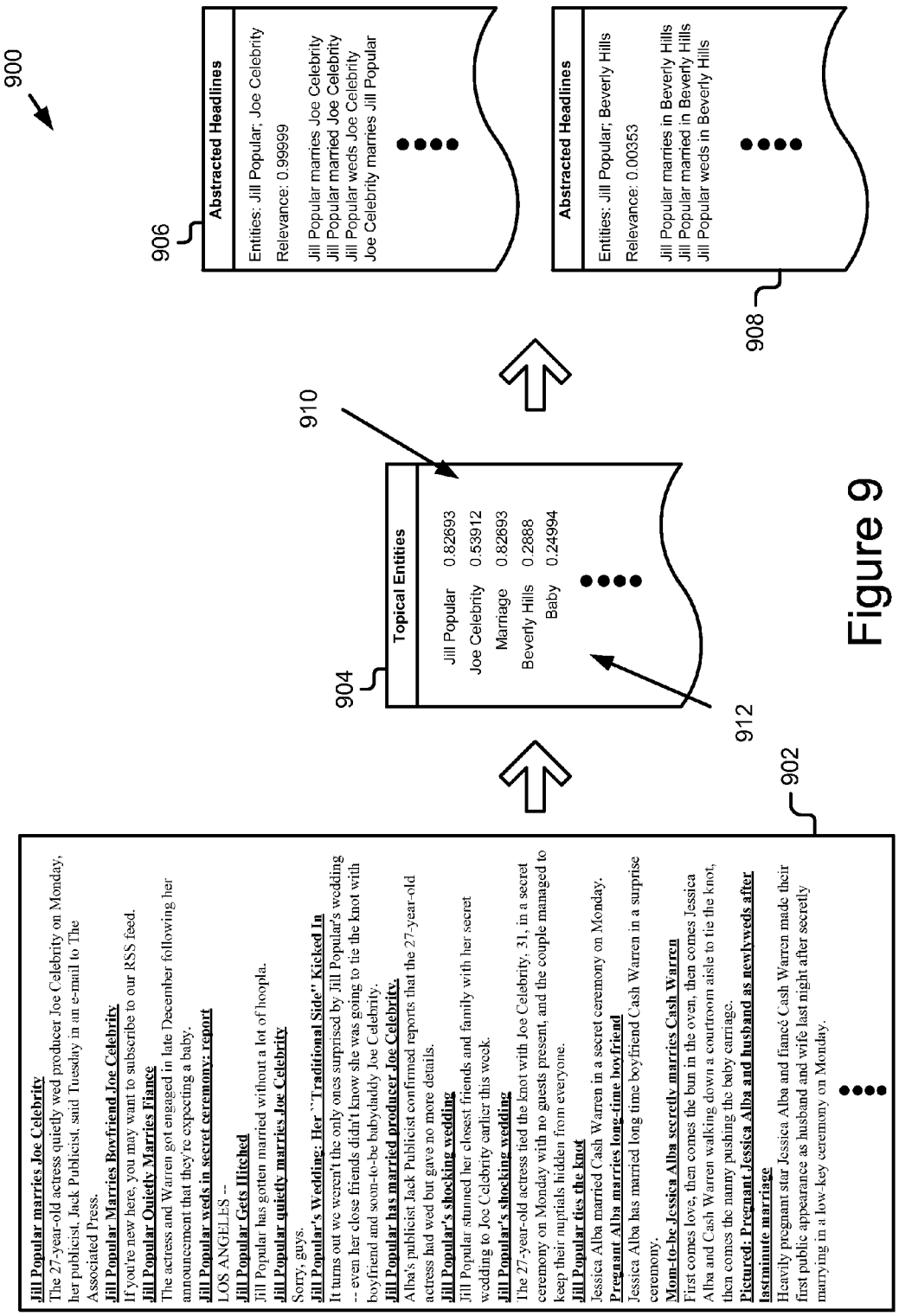
FIG. 9 is a block diagram illustrating an example method for generating relevant abstracted headlines.

By way of further illustration, FIG. 9 is a graphical representation of an example process 900 for generating clusters of equivalent syntactic patterns. In this figure, a collection 902 of news articles about a marriage between two example well-known individuals, Jill Popular and Joe Celebrity is processed by the pattern engine 220 to generating a relevance list 904 of entities 912 discussed by the articles along with quantified measurements 910 of their prominence, relevance, centrality, etc. (referred to as relevance for simplicity), of the entities based on context (e.g., their position in the articles, the number of times they are referenced, any hyperlinks linking the entities to other relevant information about those entities, search data from the search engine 118 for those entities, etc.). Using this relevance list 910 along with the words linking these entities in the news collection (e.g., the title, first sentence, first paragraph, etc.), the pattern engine 220 can generate a set of relevant equivalent syntactic patterns 906 that reflect the main event of the news collection. For these patterns, the pattern engine 220 can quantify how relevant the patterns are relative to the news collection and list the entities to which the patterns correspond. In contrast, the pattern engine 220 can also determine which patterns are less relevant/irrelevant and may exclude them based on the relevance score. The list of entities, relevancy scores, and/or expressions processed by the pattern engine 220 may be used during training, headline generation, and/or knowledge graph management as described further elsewhere herein.

The training engine 222 includes software and/or logic executable by the processor 202 to automatically learn equivalent syntactic patterns that contain corresponding information by processing a plurality of news collections. Corresponding information may include expressions that mention the same entities relative to the same or similar context (e.g., event). By processing collections of documents that are related (e.g., news articles about a current event), the training engine 222 may learn alternative ways of expressing the same entity types and/or event. This is advantageous as it allows the training engine 222 to account for the use of different words and/or synonyms by various content processes to describe the same entity types and/or events. In some implementations, the training engine 222 may discern additional hidden patterns from the cluster of equivalent syntactic patterns determined by the pattern engine 220 using a probabilistic model. This is advantageous as it can allow headlines to be generated from patterns not expressly included in the news collections from which the patterns were derived.

By way of example and not limitation, by processing one or more news collections involving sports or marriage, the training engine 222, in cooperation with the pattern engine 220, can learn that the following syntactic patterns all express the same event of a sports player joining a team:

[player] joins [sports team]
[sports team] signs [player]
[player] completes move to [sports team].

or that the following patterns are all equivalent expressions of a wedding event:

[person] wed [person]
[person] has married [person]
[person] tied the knot with [person].

It should be understood that the above non-limiting examples depict, in some cases, the surface form of the patterns, and that additional metadata associated with the patterns may be generated that includes information associated with the patterns. For example, the metadata may include data (e.g., indicators, labels, etc.) describing of the syntactic dependencies between the words of the patterns. In some implementations, this metadata may be stored in the data store 210 as training data 212 for later reference, learning, etc.

The training engine 222 may use news published during a certain timeframe (e.g., same day, few days, week, month, etc.) and/or with a common vocabulary (e.g., mentioning the same entities, types of entities, etc.) for the training. This can beneficially increase the probability that the documents of a given news collection, and the expressions included therein, pertain to the same entities and/or event described in the news, and thus increase the accuracy of the headlines generated by the inference engine 224.

In some implementations, the training engine 222, in cooperation with the pattern engine 220, can use contextual similarity to determine the context for the entities described by the documents of the news collections, and automatically cluster the entities based on the contextual similarity. In some cases, if the words, phrases, and/or idioms that are used interchangeably and/or have the same or similar meaning (e.g., are synonyms, known variants, etc.) by the expressions, the training engine 222 and/or pattern engine 220 can compute a metric reflecting the level of similarity between the context of those expressions, and can group the entities referenced by those expressions based on the strength of that metric (e.g., whether a predetermined similarity threshold has been met). This advantageously allows the training engine 222 to automatically group the entities by type (e.g., star athletes, divorcees, failing businesses, etc.).

In some instances, the training engine 222 may be initialized using a predetermined corpus of news documents organized in news collections to produce a reliable base of equivalent syntactic patterns covering the most common/ popular entity types and/or events, and once training data/ model 212 has been generated and stored in the data store 210, it can be used by the pattern engine 220 and/or training engine 222 to generate headlines for new collections as described in further detail herein. For instance, in some cases, large numbers of news collections may be processed by the training engine 222 to learn meaningful clusters that can produce reliable headline inferences by the inference engine 224. As a further example, the corpus of documents processed by the training engine may include news articles spanning one or more years (e.g., 1-10+).

In some implementations, the training engine 222 can learn equivalent syntactic patterns using a probabilistic model called Noisy-OR networks, although other models may additionally or alternatively be used by the training engine 222 and/or the inference engine 224 including those which produce a measure indicating how likely it is that two different expressions will appear in two news from the same time period (possibly describing the same event). For instance, in some implementations, the training engine 222 may cluster the patterns using latent dirichlet allocation (LDA).

In an implementation where a Noisy-OR Bayesian network is used, the training engine 222 can base the training on the co-occurrence of syntactic patterns. Each pattern identified by the pattern engine 220 can be added as an observed variable, and latent variables can be used to represent the hidden events that generate patterns. An additional noise variable may be linked by the training engine 222 to one or more terminal nodes, allowing a linked terminal to be generated by language background (noise) instead of by an actual event.

Figure 8:
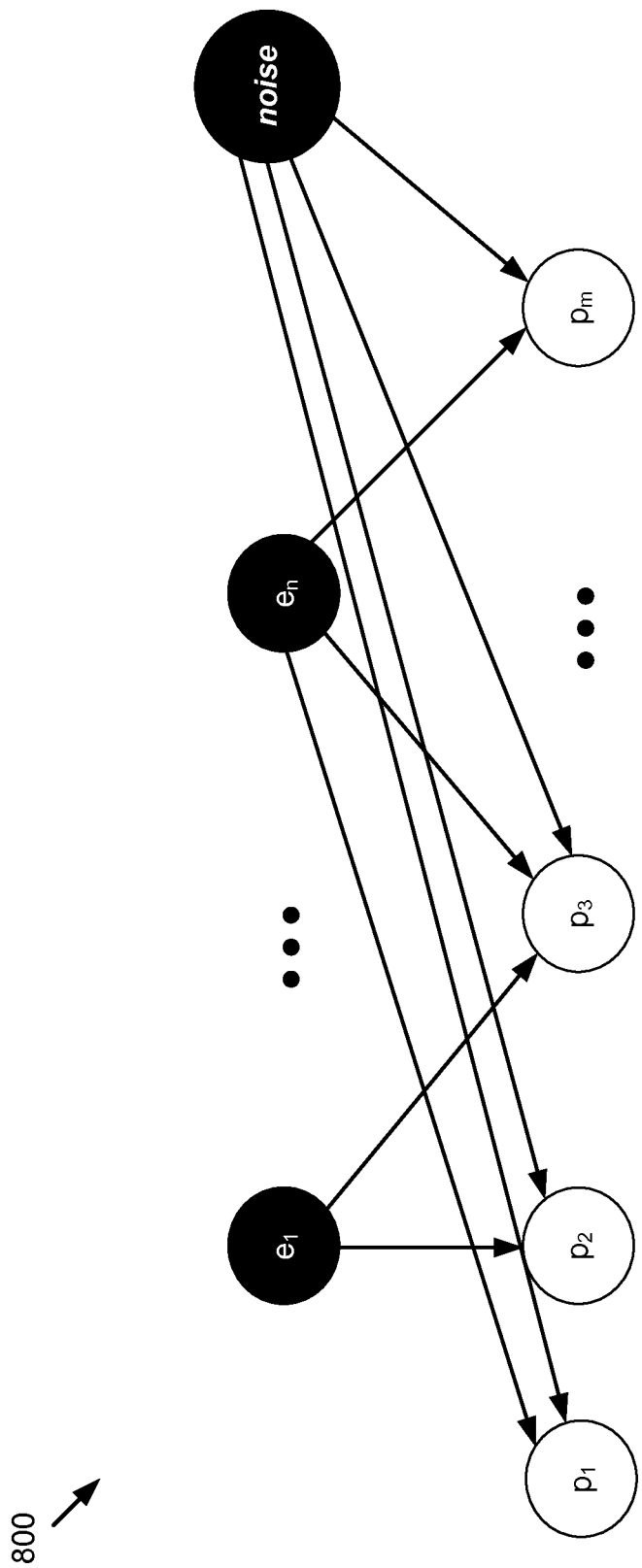
FIG. 8 depicts an example probabilistic model.

As a further example, patterns identified by the pattern engine 220 may be used by the training engine 222 to learn a Noisy-OR model by estimating the probability that each (observed) pattern activates one or more (hidden) events. FIG. 8 depicts two example levels: hidden event variables at the top, and observed pattern variables at the bottom. In this figure, an additional noise variable links to every terminal node, allowing all terminals to be generated by language background (noise) instead of by an actual event. The associations between latent events and observed patterns can be modeled by noisy-OR gates.

In this model, the conditional probability of a hidden event $e_i$ given a configuration of observed patterns $p \in \{0,1\}^{|\mathcal{P}|}$ is calculated as:

$$P(e_i = 0 \mid p) = (1 - q_{i0}) \prod_{j \in \pi_i} (1 - q_{ij})^{p_j} = \exp\left(-\theta_{i0} - \sum_{j \in \pi_i} \theta_{ij} p_j\right)$$

where $\pi_i$ is the set of active events (i.e., $\pi_i = \cup_j \{p_j\} \mid p_j = 1$), and $q_{ij} = P(e_i = 1 \mid p_j = 1)$ is the estimated probability that the observed pattern $p_i$ can, in isolation, activate the event e. The term $q_{i0}$ is the so-called "noise" term of the model, and can account for the fact that an observed event $e_i$ might be activated by some pattern that has never been observed.

All the patterns processed from the same news collection N and entity sub-set $E_i$ by the pattern engine 220 can be grouped in $\mathcal{N}$ {N, $E_i$} (e.g., see above). In some cases, these groups represent rough clusters of equivalent patterns that can be used to bootstrap the optimization of the model parameters $\theta_{ij} = -\log(1 - q_{ij})$. The training engine 222 can initiate the training process by receiving a randomly selected set of groups (e.g., 100,000) and optimizing the weights of the model through a number of expectation-maximization (EM) iterations (e.g., 40).

The training engine 222 may store the data processed and/or generated by it, the pattern engine 220, etc. as training data 212 in the data store 210 for use by the pattern engine 220 and/or the inference engine 224, or may provide such data directly to these components.

The inference engine 224 includes software and/or logic executable by the processor 202 to generate a headline for a given news collection, or document(s) contained therein, based on the main event reported by the news collection and/or document(s). By way of non-limiting example, the inference engine 224 can process an input collection containing one or more documents for equivalent syntactic patterns (e.g., using the pattern engine 220) and match those patterns with corresponding patterns learned during the training. Using the matching patterns, the inference engine 224 can then select a pattern that best represents the event reflected by the input collection and generate a headline by populating that pattern with the corresponding central entities from the news collection. The inference engine 224 may be coupled for interaction with the pattern engine 220 to determine the syntactic pattern(s) of an input collection.

In some implementations, using the patterns processed by the pattern engine 220, the inference engine 224 can estimate the posterior probability of hidden event variables. Then, from the activated hidden events, the likelihood of every pattern can be estimated, even if they do not appear in the collection. The single pattern with the maximum probability may be selected and used to generate a new headline. Having been generalized, the retrieved pattern is more likely to be objective and informative than phrases directly observed in the news collection. Using this probabilistic approach, the inference engine 224 can reliably estimate the probability that an event (e.g., represented as a set of equivalent expressions as described with respect to the training) is the most important event in a set of documents (e.g., a news collection).

In some implementations, the inference engine 224 may generate a given headline for an input collection of one or more documents (e.g., previously news collection) by selecting an expression/pattern that has the most support in the input documents. For instance, if several equivalent syntactic patterns match the patterns from a given collection of one or more document(s), these matches can reinforce each other by providing more evidentiary support that the event reflected by these patterns is the main event reported by the collection. For example, if within the same the input collection, the inference engine 224 can match [X has married Y], [X wed Y], and [X married Y], then the inference engine 224 has more evidence that this is the main event reported, compared to other events that may appear a smaller number of times.

As a further example, assume the inference engine 224 matches patterns processed by the pattern engine 220 from the input document(s) to learned patterns [X has married Y], [X wed Y], and [X married Y]. Further, assume that these expressions are associated with another equivalent learned expression, [X tied the knot with Y]. The inference engine 224 is capable of using the expression [X tied the knot with Y] to generate the headline, even though the text of the generated headline may or may not have not been present as such in the input document(s).

In some implementations, to generate a headline that captures the main event reported by a news collection N of one or more documents, inference engine 224 may select a single event-pattern p* that is especially relevant for N and replace the entity types/placeholders in p*with the actual names of the entities observed in N. To identify p*, the system may assume that the most descriptive event embodied by N describes an important situation in which some subset of the relevant entities E in N are involved.

The inference engine 224 may cooperate with the pattern engine 220 to determine patterns included in a news collection of one or more documents. For instance, given a set of entities E and sentences n, the inference engine 224 may utilize the EXTRACTPATTERNS$_\psi$(n, E) algorithm to collect patterns involving those entities. The inference engine 224 may then normalize the frequency of the identified patterns and determine a probability distribution over the observed variables in the network. To generalize across events, the inference engine 224 may traverse across the latent event nodes and pattern nodes.

In some implementations, the inference engine 224 may determine the most relevant set of events to include in the headline using an algorithm referred to herein as INFERENCE (n, E), which may include the following process.

Given a set of entities E mentioned in the news collection, the system may consider each entity subset $E_i \subseteq$. The subset can include any number of entities. In some implementations, up to relatively low number (e.g., 3, 4, etc.) entities may be used for efficiency, to keep the generated headlines relatively short, and to limit data sparsity issues. For each $E_i$, the inference engine 224 can execute INFERENCE(n, $E_i$), which computes a distribution $\omega_i$ over patterns involving the entities in $E_i$.

Next, the inference engine 224 can again invoke INFERENCE using all the patterns extracted for every subset of $E_i \subseteq E$. This computes a probability distribution $\omega$ over all patterns involving any admissible subset of the entities mentioned in the collection.

Next, the inference engine 224 can select the entity-specific distribution that approximates a better overall distribution $\omega^* = \arg\max_i \cos(\omega, \omega_i)$. In some instances, the inference engine 224 can assume that the corresponding set of entities $E_i$ are the most central entities in the collection and therefore any headline should incorporate them all, although other variations are also possible. The system can select the pattern p*with the highest weight in $\omega^*$ as the pattern that better captures the main event reported in the news collection, as reflected by the following equation:

$$p^* = p_j \mid \omega_j = \underset{j}{\mathrm{argmax}}\, \omega_j^*$$

However, it should be understood that other weight values may provide a reliable approximation as well.

The inference engine 224 can then produce a headline from p* by replacing placeholders with the entities in the document from which the pattern was extracted. While in some cases information about entity types is sufficient for the inference engine 224 to reliably determine the correct order of the entities for a given headline (e.g., "[person] married in [location]" for the entity set {$e_a$="Mr. Brown"; $e_b$="Los Angeles"}), in other cases class the correct ordering can be ambiguous (e.g., "[person] killed [person]" for {$e_a$="Mr. A"; $e_b$="Mr. B"}) and difficult to deduce. The inference engine 224 may handle these cases by having the pattern engine 220 keep track of the alphabetical ordering of the entities when extracting patterns for an entity set {$e_a$; $e_b$}, which can allow the inference engine 224 to produce the correct ordering, although other order mechanisms may also be used. For example, from a news collection about "Mr. B" killing "Mr. A", the pattern engine 220 could produce patterns including, but not limitation, "[person:2] killed [person:1]" or "[person:1] was killed by [person:2]" based on the assumption that $e_a$="Mr. A"<$e_b$="Mr. B". Then, at inference time, the inference engine 224 can query the model with such patterns and only activate the events whose assignments are compatible with the observed entities. This is advantageous as it can make the replacement of entities straightforward and unambiguous.

The inference engine may store the headlines generated by it in the data storage 210, or may provide the headlines to other entities of the system 116, including the news portal 125 and/or the knowledge graph management engine 122. It should be understood that, at different points in the headline generation process, human curation can be added to increase quality.

The knowledge graph management engine 122 includes software and/or logic executable by the processor 202 to determine the main event reported in news and using the event to update a knowledge graph. The knowledge graph management engine 122 can keep the contents of the knowledge graph up-to-date by automatically processing published news in cooperation with the other entities of the system 116. For instance, the technology can leverage the headline generation engine 120 and/or its constituent components to automatically determine updates about pertinent events included in the news and revise corresponding entries in the knowledge graph using the updates. In some cases, the knowledge graph management engine 122 may provide attribution back to the document(s) used to generate the update to provide credibility and/or traceability for the update.

By way of example, when a celebrity dies, the knowledge graph may need to be updated indicating that the celebrity is now dead and the date and place of death. As a further example, if the system determines from the news that a person has just wed, the system can update the knowledge graph to change information about who is the spouse of that person and the start-date of their marriage. Similarly, if the news report is about a person changing his/her job, or a company acquiring another company, these are relations that can be updated in the knowledge graph. Virtually anything that may be mentioned in the news, whether that be via aggregated blogs, social networks, microblogs, news networks, Internet portals, websites, press releases, or any other electronic source of information, etc., could require alterations to the contents of a knowledge base including, political events, celebrity events, sporting events, pop-culture events, financial events, etc.

For each of the clusters of equivalent patterns determined by the pattern engine 220 and/or training engine 222, the knowledge graph management engine 122 can update/annotate a corresponding entry in the knowledge graph with an update based on a matching pattern being found in newly aggregated documents and/or document collections. In some implementations, this annotation can be done automatically (e.g., by matching patterns observed in past news with past edits into the knowledge graph), etc. In some implementations, the system may automatically try to associate the clusters of patterns to the relations in the knowledge graph, and have a manual curation step where a human validates these associations. For instance, the knowledge graph management engine 122 may utilize manual assistance by providing human users with information about the observed clusters and/or suggestions for which items should be updated to the human users for confirmation.

For each news article or news collection published (either past news or real-time news), the system may determine which patterns that are mentioned between entities, and use the mapping stored in the data store 210 by the training engine 222 to discover which relation in the knowledge base should be updated. For instance, if the knowledge graph management engine 122, in cooperation with the headline generation engine 120, processes a news collection containing expressions including, for example, [X married Y], [X wed Y] and [X tied the know with Y] and knowledge graph management engine 122 can determine that X and Y have the relation spouse-of in the knowledge base (they are spouse of each other), then the knowledge graph management engine 122 can automatically learn that when it sees these patterns in the future, the relation to be updated in the knowledge base is spouse-of. For example, if the knowledge graph management engine 122 processes a news document that mentions [X married Y], and can determine that this pattern is associated to the spouse-of relation in the knowledge base, the knowledge graph management engine 122 can update the knowledge base indicating that Y is a spouse of X, and X is a spouse of Y.

Additional structure, acts, and/or functionality of the search engine 118, the headline generation engine 120 and its constituent components, the knowledge graph management engine 122, and the news portal 125 are further discussed elsewhere herein.

Figure 3:
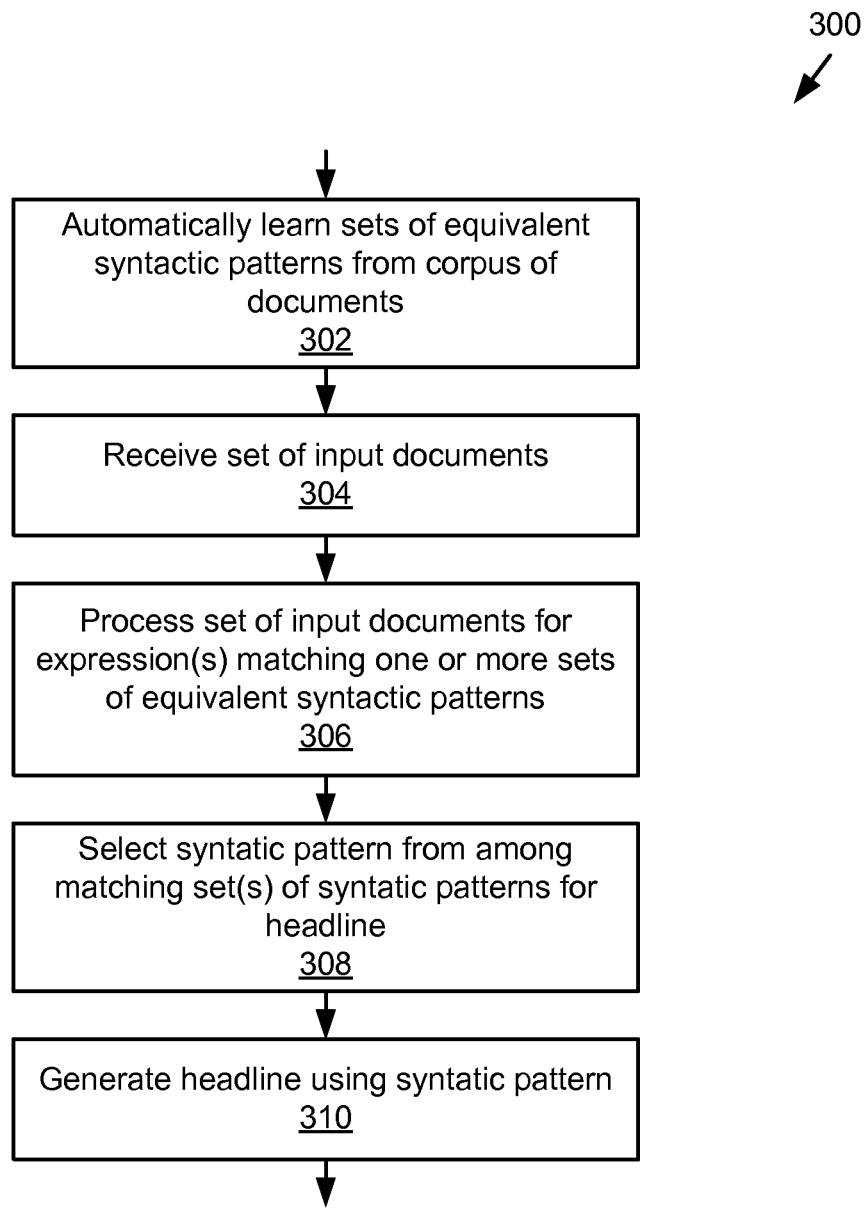
FIG. 3 is a flowchart of an example method for automatically generating headlines.

FIG. 3 is a flowchart of an example method 300 for automatically generating headlines. The method 300 may begin by automatically learning 302 sets of equivalent syntactic patterns from a corpus of documents. For example, the training engine 222 may learn equivalent syntactic patterns for a variety of topics and/or events reported by a plurality of news collections and store those patterns in the data store 210 as training data 212 for reference and/or matching during headline generation.

Next, the method 330 may receive 304 a set of input documents (e.g., news collection of news articles). The set of input documents (e.g., a news collection) may include one or more documents. The documents may include electronic files having any formatting and content (e.g., textual, graphic, embedded media, etc.). For instance, a document could include content from a webpage embodying a news article aggregated by the search engine 118. In the case of more than one document, the documents may be related (e.g., based on the content of the documents, describe the same or similar events, entities, be from the same or similar time period, etc.).

Next, the method 300 may process 306 the set of input documents for expression(s) matching one or more sets of equivalent syntactic patterns. For instance, the inference engine 224 in cooperation with the pattern engine 220 may determine a cluster of patterns for the set of input documents (e.g., news collection) and the inference engine 224 may compare those patterns with the sets of equivalent syntactic patterns learned by the training engine 222 to identify the matching patterns.

The method 300 may then select 308 a syntactic pattern from among the matching set(s) of syntactic patterns for the headline. The selected pattern may be a pattern that matched a corresponding pattern processed from the set of input documents, or may be an equivalent pattern learned by the training engine 222. The selected pattern may describe the central event of the set of input documents (e.g., news reported by news collection). Next, the method 300 may generate 310 the headline using the selected syntactic pattern. For example, the inference engine 224 may replace the entity types in the syntactic pattern with corresponding entities processed from the set of input documents.

Figure 4:
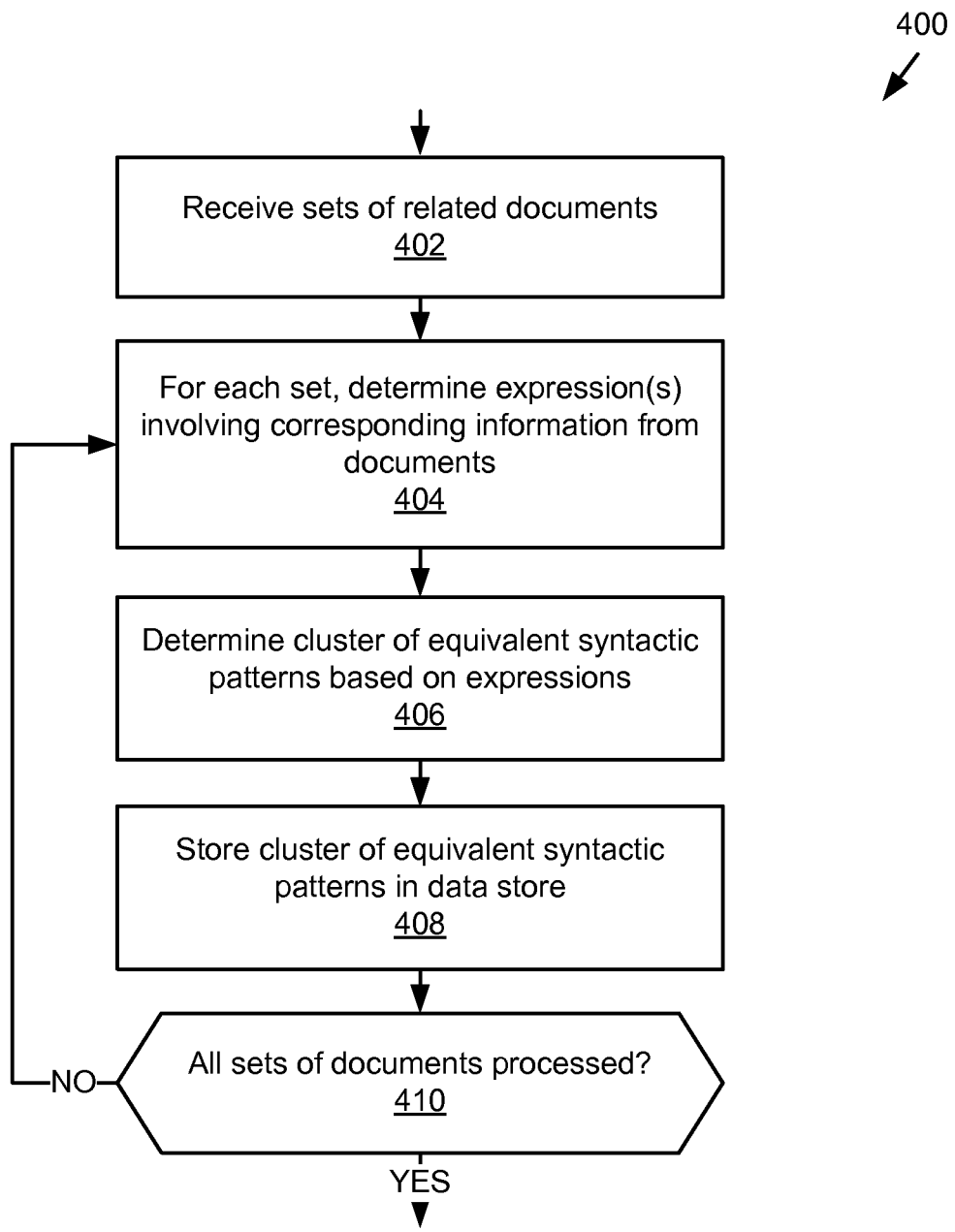
FIG. 4 is a flowchart of an example method for clustering equivalent syntactic patterns into sets based on entities and events from news documents.

FIG. 4 is a flowchart of an example method 400 for clustering equivalent syntactic patterns based on the entities and events processed from sets of input documents. The method 400 may begin by receiving 402 sets of related documents (e.g., news collections of related news articles). In some implementations, the sets of related documents may reflect a corpus of news collections describing a variety of different events that users are or would be interested in receiving information about.

For each set, the method 400 may identify 404 the most mentioned entities (e.g., the entities appearing most frequently), and may determine 406 one or more clusters of syntactic patterns that include the most mentioned entities and the events that correspond to those entities. For example, the training engine 222, in cooperation with the pattern engine 220, may determine and optimize sets of synonymic expressions (e.g., equivalent syntactic patterns) respectively describing one or more entity types and an event involving the entity types and store 408 them in the data store 210. As a further example, the training engine 222 can deduce the different ways the set of documents describes a given event down to a set of equivalent syntactic patterns, determine one or more additional corresponding synonymous syntactic patterns using a probabilistic model if sufficient evidence exists, and store them as a set for reference by the inference engine 224 during headline generation. The method 400 may then determine 410 whether all documents have been processed, and if they have, may repeat, continue to other operations, or end. If all sets have not been processed, the method 400 may return to block 404 and process the next set.

Figures 5A, 5B:
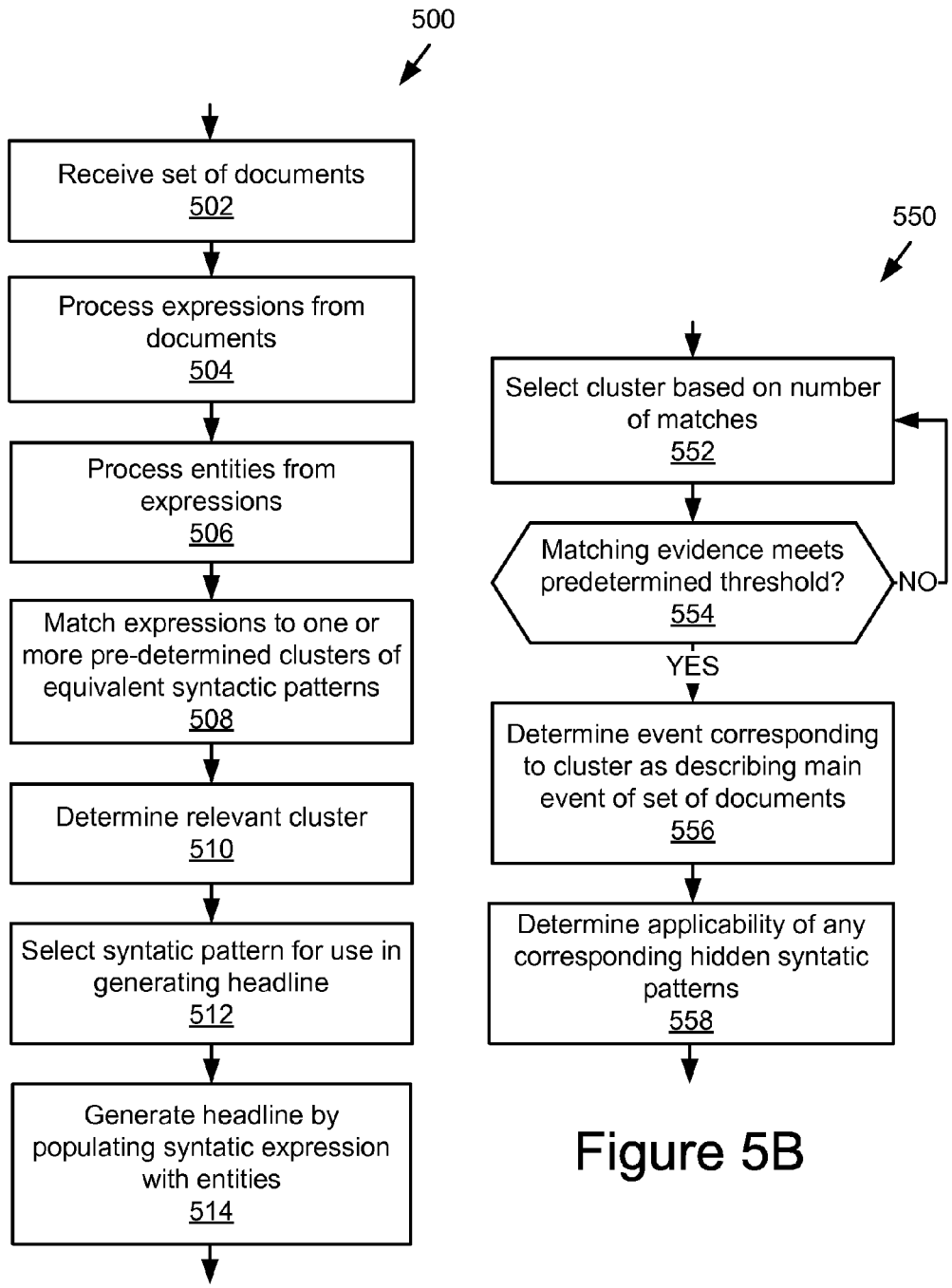
FIGS. 5A-B are flowcharts of example methods related to generating headlines for news documents based on clusters of equivalent syntactic patterns.

FIG. 5A is a flowchart of an example method 500 for generating headlines for a set of news documents based on clusters of equivalent syntactic patterns. The method 500 may begin by receiving 502 a set of documents. For example, the set of documents may be a collection of related news articles reporting on a current event which was aggregated by the search engine 118 and for which a headline should be generated to objectively characterize the current event. Next, the method 400 may process 504 expressions from the documents of the set, process 506 entities from the expressions, and match 506 the expressions to one or more pre-determined clusters of equivalent syntactic patterns. For example, assuming a news collection including five related news articles describing a particular event, the inference engine 224, in cooperation with the pattern engine 220, may process a set of differently worded expressions about the event from the title and/or text of the articles and match the expressions to one or more clusters of equivalent syntactic patterns describing that event.

The method 500 may continue by determining 510 which of the matching clusters is relevant (e.g., the most relevant) if there are more than one, or if there is only one, whether the matching cluster is relevant or relevant enough. One example method 550 for making this determination is depicted in FIG. 5B. In block 552, the method 550 may select 552 a cluster to use from among the matching clusters and determine 554 whether the matching evidence for that cluster meets a predetermined threshold. For instance, if the number of (e.g., 2, 3, 4, etc.) differently worded expressions process from the set of documents respectively satisfy a predetermined threshold of equivalent syntactic patterns from the selected cluster, the method 550 may continue to block 556. This is advantageous as it can determine whether the selected cluster describes the main event reported by the set of documents. If the threshold in 554 is not met, the method 550 may return to block 552 to select a different cluster to use, may process additional expressions from the documents and repeat the matching sequence, may terminate, etc.

In block 556, the method 550 may determine 556 the event corresponding to the selected cluster as describing the main event of the set of documents and then determine 558 whether there are any corresponding hidden syntactic patterns describing hidden events that apply to the set of documents, as described, for example, elsewhere herein with reference to the training module 222.

Returning to FIG. 5A, the method 500 may continue by selecting 512 a syntactic pattern from the most relevant cluster with which to generate the headline, and may proceed to generate 514 the headline by populating the syntactic expression with the entities processed from the expressions processed from the set of documents.

Figure 6:
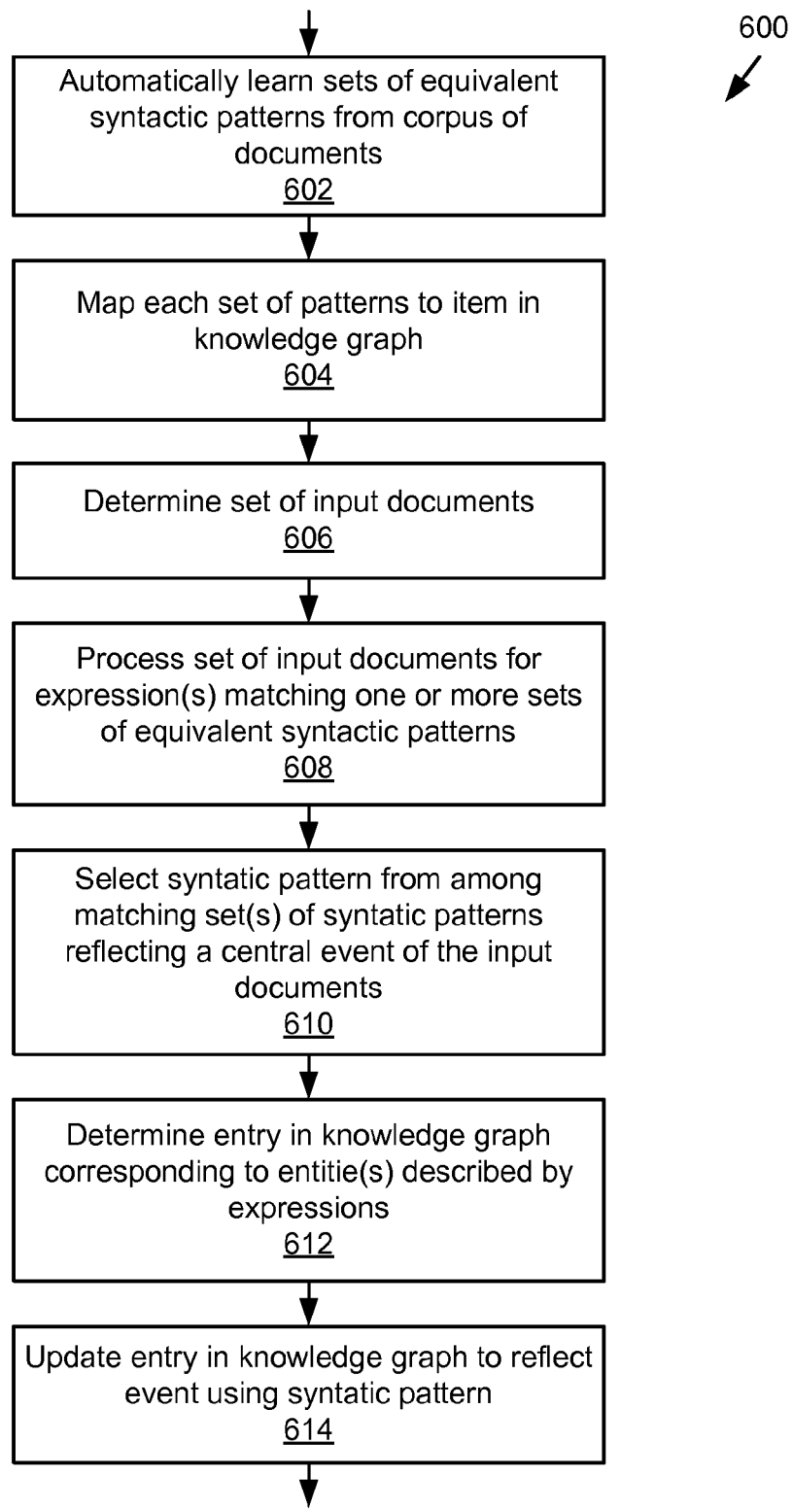
FIG. 6 is a flowchart of an example method for automatically updating a knowledge graph based on clusters of equivalent syntactic patterns.

FIG. 6 is a flowchart of an example method 600 for automatically updating a knowledge graph based on sets of equivalent syntactic patterns. The method 600 may begin by determining 602 clusters of equivalent syntactic patterns as described in further detail elsewhere herein. The method 600 may then map 604 each set of patterns to a corresponding item in the knowledge graph. For example, the knowledge graph may consistently describe various items (e.g., events) for entities that share similarities. For example, for people described in the knowledge graph, the knowledge graph may include a base set of information that are unique to people. For instance, the knowledge graph may include information about significant events that occur in one's lifetime. As a further example, the knowledge base may include for a birth, the date and place of birth, gender of the baby, etc. For a death, the name and relation to the deceased (if not the person him/herself), circumstances of the death, etc. For a marriage, who the person married, the number of previous marriages, details about the wedding, etc. The knowledge graph management engine 122 may map these items to corresponding sets/clusters of equivalent syntactic patterns that describe these events.

Next, the method 600 may determine 606 a set of input documents and process 608 the set of input documents for expressions matching one or more sets of equivalent syntactic patterns as discussed elsewhere herein. The method 600 may then continue by selecting 610 a syntactic pattern from among the matching set of equivalent syntactic patterns, the selected pattern reflecting a central event of the input documents. In some instances, the selected pattern may be a hidden synonymous pattern as described elsewhere herein.

The method 600 may proceed to determine 612 one or more entries in the knowledge graph that corresponds to the entity(ies) described by the expressions processed from the input documents, and may update 614 the one or more entries to reflect the event using the selected syntactic pattern. For instance, for an item (e.g., a relation) of marriage, the knowledge graph management engine 122 may leverage an API exposed by the knowledge graph 124 to update the marriage section of the entries corresponding to two celebrities to include a recently announced engagement or a solemnized marriage between the two celebrities, as reported by the news (e.g., the news collection of articles about the engagement or wedding).

FIG. 7 is an example method depicting an example pattern determination process. The pattern determination process may include an annotated dependency parse as discussed elsewhere herein. In (1), an MST is processed for the entity pair e1, e2. In (2), nodes are heuristically added to the MST to enforce grammaticality in (3). In (4), entity types are recombined to generate the final patterns.

FIG. 8 depicts an example probabilistic model. In this model, the associations between latent event variables and observed pattern variables are modeled by noisy-OR gates. Events may be assumed to be marginally independent, and patterns conditionally independent given the events, as discussed elsewhere herein.

FIG. 10 is a graphical representation of an example user interface 900 depicting an example headline generated by the news system 116. The user interface 900 includes a set of results 904 matching a search for news articles about an example celebrity, Jill Popular. The results 904 include a news collection about Jill Popular's marriage to Joe Celebrity, with an example title "Jill Popular marries Joe Celebrity" generated by the news system 116. In this example, the title is an objective, succinct representation of the documents included in the news collection 906, although it should be understood that headlines generated by the news system 116 may be generated with different characteristics intended to serve different purposes.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the present disclosure is not described with reference to any particular programming language. It will be appreciated that a variety of programming languages may be used to implement the teachings of the present disclosure as described herein.

The foregoing description has been presented for the purposes of illustration and description. It is not intended to be exhaustive or to limit the present disclosure to the precise form disclosed. Many modifications and variations are possible in light of the above teaching. It is intended that the scope of the disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:
1. A computer-implemented method comprising:
learning sets of equivalent syntactic patterns from a corpus of documents;
mapping the sets of equivalent syntactic patterns to corresponding items in a knowledge graph;
receiving a set of one or more input documents;
processing the set of one or more input documents for one or more expressions matching a first set of equivalent syntactic patterns from among the sets of equivalent syntactic patterns;
processing the one or more expressions to determine one or more entities;
determining a set of entities that are relevant to a main event described by the set of one or more input documents from the one or more entities;
identifying entity types for the set of entities;
generating a refined set of equivalent syntactic patterns by excluding the equivalent syntactic patterns with a relevance score below a predefined threshold;
selecting an equivalent syntactic pattern from among the refined set of equivalent syntactic patterns for a headline, the selected equivalent syntactic pattern reflecting the main event described by the set of one or more input documents;
generating the headline by populating the selected equivalent syntactic pattern with the one or more entities, wherein an order of the entities in the headline is based on the entity types of the one or more entities;
determining one or more entries in the knowledge graph corresponding to the one or more entities described by the one or more expressions; and
updating the one or more entries in the knowledge graph to reflect the main event using the headline.

2. The computer-implemented method of claim 1, wherein the set of one or more input documents include a news collection of related news articles.

3. The computer-implemented method of claim 1, wherein learning the sets of equivalent syntactic patterns further includes:
receiving sets of related documents;
determining, for each of the sets of related documents, expressions involving corresponding information;
determining sets of equivalent syntactic patterns based on the expressions; and
storing the sets of equivalent syntactic patterns in a data store.

4. The computer-implemented method of claim 3, further comprising:
determining additional hidden syntactic patterns to include in one or more of the sets of equivalent syntactic patterns using a probabilistic model.

5. The computer-implemented method of claim 1, wherein processing the set of one or more input documents includes:
determining that a number of expressions processed from the one or more input documents meets a pre-determined evidence threshold; and
determining the set of equivalent syntactic patterns to be relevant to the set of one or more input documents based on the evidence threshold being met.

6. A computer program product comprising a non-transitory computer usable medium including a computer readable program, wherein the computer readable program when executed on a computer causes the computer to:
learn sets of equivalent syntactic patterns from a corpus of documents;
map the sets of equivalent syntactic patterns to corresponding items in a knowledge graph;
receive a set of one or more input documents;

process the set of one or more input documents for one or more expressions matching a first set of equivalent syntactic patterns from among the sets of equivalent syntactic patterns;

process the one or more expressions to determine one or more entities;

determine a set of entities that are relevant to a main event described by the set of one or more input documents from the one or more entities;

identify entity types for the set of entities;

generate a refined set of equivalent syntactic patterns by excluding the equivalent syntactic patterns with a relevance score below a predefined threshold;

select an equivalent syntactic pattern from among the refined set of equivalent syntactic patterns for a headline, the selected equivalent syntactic pattern reflecting the main event described by the set of one or more input documents;

generate the headline by populating the selected equivalent syntactic pattern with the one or more entities, wherein an order of entities in the headline is based on the entity types of the one or more entities;

determine one or more entries in the knowledge graph corresponding to the one or more entities described by the one or more expressions; and update the one or more entries in the knowledge graph to reflect the main event using the headline.

7. The computer program product of claim 6, wherein the set of one or more input documents include a news collection of related news articles.

8. The computer program product of claim 6, wherein to learn the sets of equivalent syntactic patterns further includes:

receiving sets of related documents;

determining, for each of the sets of related documents, expressions involving corresponding information;

determining sets of equivalent syntactic patterns based on the expressions; and storing the sets of equivalent syntactic patterns in a data store.

9. The computer program product of claim 8, wherein the computer readable program, when executed on the computer, further causes the computer to:

determine additional hidden syntactic patterns to include in one or more of the sets of equivalent syntactic patterns using a probabilistic model.

10. The computer program product of claim 6, wherein to process the set of one or more input documents includes:

determining that a number of expressions processed from the one or more input documents meets a pre-determined evidence threshold; and determining the set of equivalent syntactic patterns to be relevant to the set of one or more input documents based on the evidence threshold being met.

11. A system comprising:

a processor;

a memory storing instructions that, when executed by the processor, cause the system to:

learn sets of equivalent syntactic patterns from a corpus of documents;

map the sets of equivalent syntactic patterns to corresponding items in a knowledge graph;

receive a set of one or more input documents;

process the set of one or more input documents for one or more expressions matching a first set of equivalent syntactic patterns from among the sets of equivalent syntactic patterns;

process the one or more expressions to determine one or more entities;

determine a set of entities that are relevant to a main event described by the set of one or more input documents from the one or more entities;

identify entity types for the set of entities;

generate a refined set of equivalent syntactic patterns by excluding the equivalent syntactic patterns with a relevance score below a predefined threshold;

select an equivalent syntactic pattern from among the refined set of equivalent syntactic patterns for a headline, the selected equivalent syntactic pattern reflecting the main event described by the set of one or more input documents;

generate the headline by populating the selected equivalent syntactic pattern with the one or more entities, wherein an order of the entities in the headline is based on the entity types of the one or more entities;

determine one or more entries in the knowledge graph corresponding to the one or more entities described by the one or more expressions; and update the one or more entries in the knowledge graph to reflect the main event using the headline.

12. The system of claim 11, wherein the set of one or more input documents include a news collection of related news articles.

13. The system of claim 11, wherein to learn the sets of equivalent syntactic patterns further includes:

receiving sets of related documents;

determining, for each of the sets of related documents, expressions involving corresponding information;

determining sets of equivalent syntactic patterns based on the expressions; and storing the sets of equivalent syntactic patterns in a data store.

14. The system of claim 13, wherein the instructions, when executed, further cause the system to:

determine additional hidden syntactic patterns to include in one or more of the sets of equivalent syntactic patterns using a probabilistic model.

15. The system of claim 11, wherein to process the set of one or more input documents includes:

determining that a number of expressions processed from the one or more input documents meets a pre-determined evidence threshold; and determining the set of equivalent syntactic patterns to be relevant to the set of one or more input documents based on the evidence threshold being met.

* * * * *